US012682489B2

(12) United States Patent (10) Patent No.: US 12,682,489 B2
Kanda et al. (45) Date of Patent: Jul. 14, 2026

(54) OBJECT DETERMINING APPARATUS, IMAGE PICKUP APPARATUS, AND OBJECT DETERMINING METHOD

(71) Applicant: CANON KABUSHIKI KAISHA, Tokyo (JP)

(72) Inventors: Akihiko Kanda, Kanagawa (JP); Hideki Ogura, Kanagawa (JP); Hiroshi Yashima, Kanagawa (JP); Yohei Matsui, Kanagawa (JP); Kuniaki Sugitani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 18/467,327

(22) Filed: Sep. 14, 2023

(65) Prior Publication Data

US 2024/0127476 A1 Apr. 18, 2024

(30) Foreign Application Priority Data

Oct. 11, 2022 (JP) ................................. 2022-163318

(51) Int. Cl.
*G06T 7/73* (2017.01)

(52) U.S. Cl.
CPC ...... *G06T 7/74* (2017.01); *G06T 2207/20084* (2013.01)

(58) Field of Classification Search
CPC ............. G06T 7/74; G06T 2207/20084; G06T 2207/20081; G06T 7/70; G06V 10/44; G06V 10/82; G06V 40/10; G06V 40/161; G06V 40/168
See application file for complete search history.

(56) References Cited

U.S. PATENT DOCUMENTS 11,023,707 B2 * 6/2021 Seshadri ........... G06F 18/24133
11,531,402 B1 * 12/2022 Stolzenberg ........ G06F 3/04847
(Continued)

FOREIGN PATENT DOCUMENTS

JP 2014-128002 A 7/2014

OTHER PUBLICATIONS

Zhe Cao et al., "Realtime Multi-Person 2D Pose Estimation using Part Affinity Fields", Proceedings of the IEEE Conference on Computer Vision and Pattern Recognition, 9 pgs 2017 Cited in Specification in paragraphs [0045].
(Continued)

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

An object determining apparatus includes a memory storing instructions, and a processor configured to execute the instructions to detect an object from image data obtained by imaging, acquire information about orientation of the object from the image data, determine a main object in the image data using a detection result of the object and the information about the orientation, and change a condition for determining the main object according to one of the detection result of the object and the information about the orientation, using the other of the detection result of the object and the information about the orientation.

19 Claims, 16 Drawing Sheets

(56)        References Cited

U.S. PATENT DOCUMENTS

| | | | | |
|---|---|---|---|---|
| 2016/0092736 A1* | 3/2016 | Mai | ........................ | G06V 40/10 |
| | | | | 382/103 |
| 2017/0053409 A1* | 2/2017 | Yamamoto | ............. | G06V 40/10 |
| 2017/0364771 A1* | 12/2017 | Pinheiro | ................ | G06N 3/084 |
| 2018/0350094 A1* | 12/2018 | Wang | ...................... | G06T 7/292 |
| 2019/0130165 A1* | 5/2019 | Seshadri | .......... | G06F 18/24133 |
| 2019/0213420 A1* | 7/2019 | Karyodisa | .............. | G06V 20/41 |
| 2019/0294881 A1* | 9/2019 | Polak | ...................... | G06F 16/71 |
| 2019/0347826 A1* | 11/2019 | Zhang | ........................ | G06T 7/75 |
| 2019/0379819 A1* | 12/2019 | Shimada | .............. | G06V 10/454 |
| 2020/0111226 A1* | 4/2020 | Rakesh Nattoji Rajaram | ............. | |
| | | | | G06T 7/75 |
| 2020/0186748 A1* | 6/2020 | Baba | ........................ | H04N 5/91 |
| 2020/0314318 A1* | 10/2020 | Harada | ................... | H04N 23/45 |
| 2021/0027081 A1* | 1/2021 | Zhang | ........................ | G06T 7/55 |
| 2021/0097715 A1* | 4/2021 | Li | ............................. | G06T 7/73 |
| 2021/0224312 A1* | 7/2021 | Harikumar | ............ | G06F 16/532 |
| 2022/0114803 A1* | 4/2022 | Wang | ...................... | G06V 10/70 |
| 2022/0301277 A1* | 9/2022 | Xu | ............................. | G06T 7/73 |
| 2022/0309992 A1* | 9/2022 | Uchihara | ................ | G06F 3/013 |
| 2022/0377486 A1* | 11/2022 | Arya | ........................ | H04S 7/303 |

OTHER PUBLICATIONS

Joseph Redmon et al., "You only look once: Unified, Real-Time Object Detection", Proceedings of the IEEE conference on computer vision and pattern recognition, 10 pgs, 2016 Cited in Specification in paragraphs [0103].

* cited by examiner

S300 — IMAGING PROCESSING

S301 — EXPOSURE CONTROL PROCESSING

S302 — STILL IMAGE READING

S303 — DEFECTIVE PIXEL INTERPOLATION PROCESSING

S304 — CONVERSION PROCESSING

S305 — IMAGE SIGNAL RECORDING

S306 — CAMERA CHARACTERISTIC INFO RECORDING

S307 — LENS CHARACTERISTIC INFO RECORDING

S308 — IMAGE RELATED INFO RECORDING

S309 — PREVIEW DISPLAY

RETURN

OBJECT TRACKING AF PROCESSING

S401 ACQUIRE DEFOCUS MAP

S402 OBJECT DETECTION AND TRACKING PROCESSING

S403 AUTHENTICATION PROCESSING

S404 ORIENTATION INFO ACQUISITION PROCESSING

S405 MAIN OBJECT DETERMINATION PROCESSING

S406 SET FOCUS DETECTING AREA

S407 ACQUIRE FOCUS DETECTION RESULT

S408 PREDICTIVE AF PROCESSING

S409 FOCUSING PROCESSING

RETURN

FIG. 16A
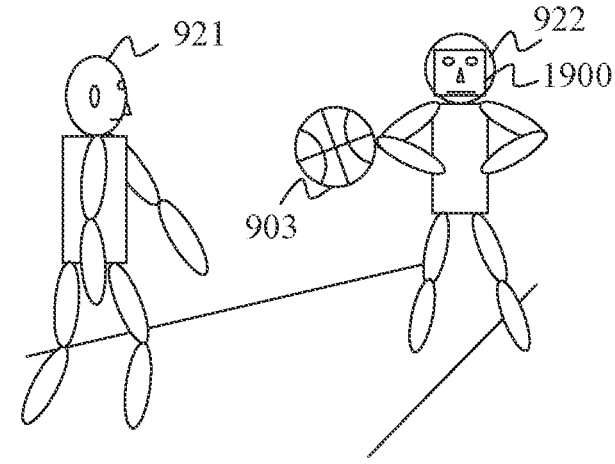
FIG. 16B
FIG. 16C
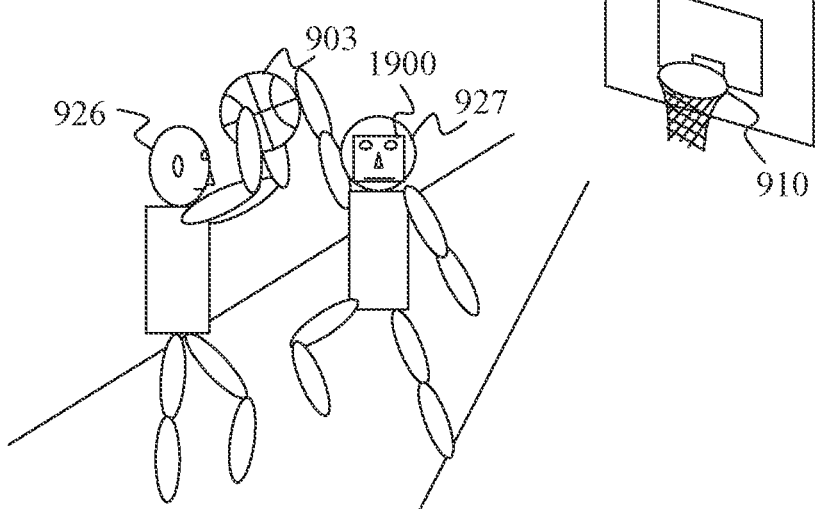

OBJECT DETERMINING APPARATUS, IMAGE PICKUP APPARATUS, AND OBJECT DETERMINING METHOD

BACKGROUND

Technical Field

One of the aspects of the embodiments relates to an image pickup apparatus with a function of determining an object.

Description of Related Art

In a case where a plurality of moving objects are detected in continuous still image capturing or moving image capturing, a main object is to be determined among the plurality of objects and continuously focused. As a method of determining a main object, Japanese Patent Laid-Open No. 2014-128002 discloses a method of obtaining the priority of each of two detected objects and determining the one with the higher priority as the main object.

However, the method disclosed in Japanese Patent Laid-Open No. 2014-128002 may erroneously determine as the main object an object different from an object that the user intends to capture.

SUMMARY

An object determining apparatus according to one aspect of the embodiment includes a memory storing instructions, and a processor configured to execute the instructions to detect an object from image data obtained by imaging, acquire information about orientation of the object from the image data, determine a main object in the image data using a detection result of the object and the information about the orientation, and change a condition for determining the main object according to one of the detection result of the object and the information about the orientation, using the other of the detection result of the object and the information about the orientation.

An object determining apparatus according to another aspect of the embodiment includes a memory storing instructions, and a processor configured to execute the instructions to detect an object from image data obtained by imaging, perform personal authentication for a detected object, detect an orientation of the object from the image data and acquire information about the orientation, determine a main object in the image data using a detection result of the object and the information about the orientation, and control at least one of a detection of the orientation and a determination of the main object so that an authenticated object is more likely to be determined as the main object than an unauthenticated object.

An object determining apparatus according to another aspect of the embodiment includes a memory storing instructions, and a processor configured to execute the instructions to detect an object from image data obtained by imaging, perform personal authentication for a detected object, acquire information about orientation of the object from the image data, determine a main object in the image data using a detection result of the object and the information about the orientation, and preferentially determine an authenticated object as the main object, in a case where there are a plurality of objects for each of which the information about the orientation has been acquired.

An image pickup apparatus having any one of the above object determining apparatus also constitutes another aspect of the embodiment. An object determining method corresponding to any one of the above object determining apparatus also constitutes another aspect of the embodiment.

Further features of the disclosure will become apparent from the following description of embodiments with reference to the attached drawings.

BRIEF DESCRIPTION OF THE DRAWINGS

FIGS. 16A, 16B, and 16C are conceptual diagrams illustrating main object determination processing according to Example 1.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

Example 1

Figure 1:
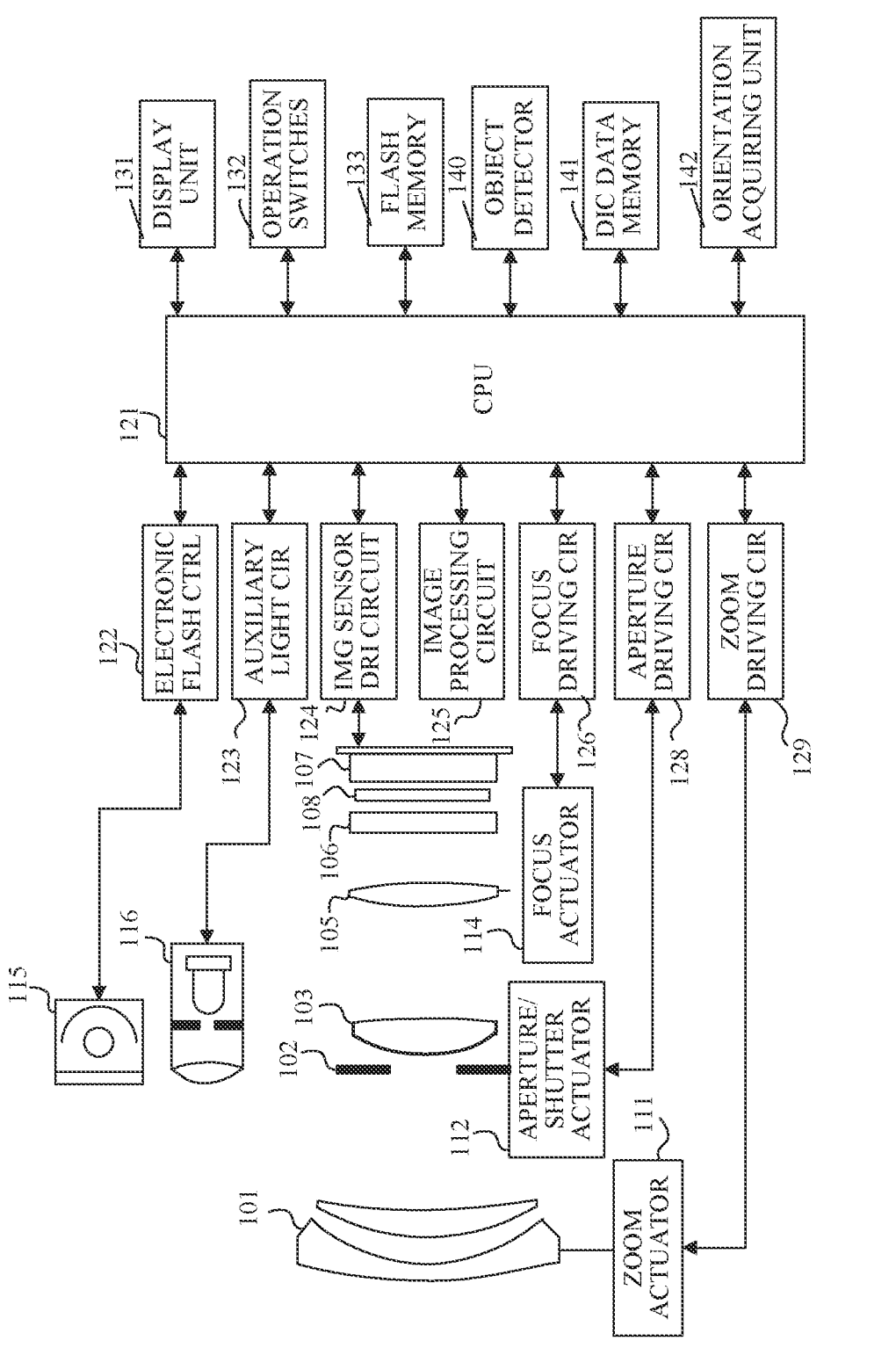
FIG. 1 is a block diagram illustrating a configuration of a camera according to Example 1.

FIG. 1 illustrates a configuration of a camera 100 as an electronic apparatus or an image pickup apparatus including an object determining apparatus as an image processing apparatus according to Example 1. In FIG. 1, a first lens unit 101 is disposed closest to the object (front) in an imaging optical system and is held movably in an optical axis direction (direction of the optical axis of the imaging optical system). An aperture stop (diaphragm) 102 adjusts a light amount by adjusting its aperture diameter. A second lens unit 103 moves together with the aperture stop 102 in the optical axis direction and performs magnification variation (zooming) together with the first lens unit 101 that moves in the optical axis direction.

A third lens unit (focus lens) 105 moves in the optical axis direction during focusing. An optical low-pass filter 106 is an optical element for reducing false colors and moire in a captured image. The first lens unit 101, the aperture stop 102, the second lens unit 103, the third lens unit 105, and the optical low-pass filter 106 constitute the imaging optical system.

A zoom actuator 111 rotates an unillustrated cam cylinder around the optical axis, and cams provided on the cam cylinder move the first lens unit 101 and the second lens unit 103 in the optical axis direction during magnification variation. An aperture actuator 112 drives a plurality of unillustrated light shielding blades in an opening or closing direction for adjusting the light amount in the aperture stop 102. A focus actuator 114 moves the third lens unit 105 in the optical axis direction during focusing.

A focus driving circuit 126 serves as a focusing unit and drives the focus actuator 114 according to a focus driving command from the camera CPU 121 to move the third lens unit 105 in the optical axis direction. An aperture driving circuit 128 drives the aperture actuator 112 according to an aperture driving command from the camera CPU 121. A zoom driving circuit 129 drives the zoom actuator 111 according to a zoom operation by the user.

In this example, the imaging optical system, actuators 111, 112, and 114, and driving circuits 126, 128, and 129 are integrated with the camera body including an image sensor 107. However, an interchangeable lens having the imaging optical system, actuators 111, 112, and 114, and driving circuits 126, 128, and 129 may be attachable to and detachable from the camera body.

An electronic flash 115 has a light emitting element such as a xenon tube or LED, and emits light to illuminate the object. An AF auxiliary light emitting unit 116 has a light emitting element such as an LED and projects an image of a mask having a predetermined opening pattern onto an object via a projection lens, thereby improving focus detecting performance on a dark or low-contrast object. An electronic flash control circuit 122 controls the electronic flash 115 to light in synchronization with an imaging operation. An auxiliary light driving circuit 123 performs control to turn on the AF auxiliary light emitting unit 116 in synchronization with the focus detecting operation.

A camera CPU 121 controls various controls in the camera 100. The camera CPU 121 has a calculator, a ROM, a RAM, an A/D converter, a D/A converter, a communication interface circuit, and the like. The camera CPU 121 drives various circuits in the camera 100 according to a computer program stored in the ROM, and controls a series of operations such as autofocus (AF), imaging, image processing, and recording.

The image sensor 107 includes a two-dimensional CMOS photosensor containing a plurality of pixels and its peripheral circuits and is disposed on an imaging surface of the imaging optical system. The image sensor 107 photoelectrically converts an object image formed by the imaging optical system. An image sensor driving circuit 124 controls the operation of the image sensor 107, A/D-converts an analog signal generated by photoelectric conversion, and transmits the digital signal to the camera CPU 121.

A shutter 108 is a focal plane shutter and is driven by a shutter driving circuit built into the shutter 108 based on an instruction from the camera CPU 121. The shutter 108 opens in a case where the image sensor 107 is exposed to light so that an imaging light beam reaches the image sensor 107, and closes to shield the image sensor 107 from light during signal reading from the image sensor 107.

An image processing circuit 125 performs predetermined image processing for the image data accumulated in the RAM within the camera CPU 121. The image processing performed by the image processing circuit 125 includes development processing such as white balance processing, color interpolation (demosaicing) processing, and gamma correction processing, as well as signal format conversion processing and scaling processing. The image processing circuit 125 stores the processed image data, joint positions of each object, information on the position and size of unique objects, information on the center of gravity of the object, information on the positions of the face and eyes, and the like in the RAM in the camera CPU 121. These pieces of information may be used for white balance adjustment processing and the like.

A display unit 131 has a display element such as an LCD, and displays information about the imaging mode of the camera 100, a preview image before imaging, a confirmation image after imaging, an index of the focus detecting area, a focus state, and the like.

Operation switches 132 include a main (power) switch, a release (imaging trigger) switch, a zoom operation switch, an imaging mode selection switch, etc., and are operated by the user. A flash memory 133 records captured images. The flash memory 133 is removable from the camera 100.

The object detector 140 as a first detector detects an object based on dictionary data generated by machine learning. In this example, the object detector 140 uses dictionary data for each object in order to detect a plurality of types of objects. The dictionary data is, for example, data in which features of corresponding objects are registered (registered object data). The dictionary data for each object, that is, a plurality of dictionary data are stored in a dictionary data memory 141. The object detector 140 detects an object while sequentially switching dictionary data for each object. The camera CPU 121 determines which of the plurality of dictionary data is to be used to detect an object, based on the preset priority of the object and the priority setting of the camera 100. The object detection detects a person and organs such as a person's face, eyes (pupils), and body. The object detection may detects an object other than a person (such as a ball).

The object detector 140 identifies an individual whose face has been registered in advance (for personal authentication). The camera 100 according to this example has a face registration mode. The face registration mode registers feature information indicating the feature amount of the detected face area in the dictionary data. The personal authentication detects organs such as the eyes and mouth of a person in a captured image, extracts the feature amount of the person's face, and calculates the similarity with the feature amount of the face (registered object) previously registered in the dictionary data. In a case where the similarity is equal to or higher than a threshold, the person is authenticated by determining that the face of the person in the captured image is the face of the person who has already been registered in the dictionary data.

The camera CPU 121 serves as a determining unit and determines a main object using the similarity as the object detection result and the information about the orientation (attitude) described below. At this time, the camera CPU 121 changes the condition for determining the main object according to one of the similarity and the information about the orientation, using the other of the similarity and the information about the orientation. The condition includes a first threshold, a second threshold, and the number of image data from which information about the orientation is to be acquired, which will be described below.

An orientation acquiring unit 142 serves as a second detector and estimates the orientation of each of the plurality of objects detected by the object detector 140, and acquires the information about the orientation (hereinafter referred to as orientation information). The content of the orientation information to be acquired is determined according to the type of object. Here, the object is a person, the orientation acquiring unit 142 acquires the positions of a plurality of joints of the person as the object. An orientation estimating method can use, for example, the method described in Cao, Zhe, et al., "Realtime multi-person 2d pose estimation using part affinity fields.", Proceedings of the IEEE Conference on Computer Vision and Pattern Recognition, 2017. Details of the acquisition of the orientation information in this example will be described below.

The object detector 140 estimates the position of the object in the image data based on the captured image data and the dictionary data for each object stored in a dictionary data memory 141. The object detector 140 may estimate the position, size, reliability, etc. of the object and output the estimated information or other information. The dictionary data for object detection includes, for example, dictionary data for detecting a "person" as an object, dictionary data for detecting an "animal," dictionary data for detecting a "vehicle," dictionary data for detecting a ball, and the like. Dictionary data for detecting a "whole person" and dictionary data for detecting organs such as the "person's face" may be stored separately in the dictionary data memory 141.

The object detector 140 according to this example includes a machine-learned Convolutional Neural Network (CNN) and estimates the position of the object included in the image data. The object detector 140 according to this example is configured by different CNNs. The object detector 140 may be realized by a circuit specialized for estimation processing by a graphics processing unit (GPU) or CNN.

Any CNN machine learning method may be used. For example, a specific computer such as a server may perform CNN machine learning, and the camera 100 may acquire the learned CNN from the specific computer. For example, the CNN of the object detector 140 may be learned with a teacher using image data for learning as input and the position of the object corresponding to the image data for learning as teacher data. The CNN learning may be performed by an information processing apparatus mounted on the camera 100.

The object detector 140, the dictionary data memory 141, the orientation acquiring unit 142, and the camera CPU 121 constitute an object determining apparatus as a computer. The object detector 140, the orientation acquiring unit 142, and the camera CPU 121 execute processing described below according to a computer program.

Figure 2:
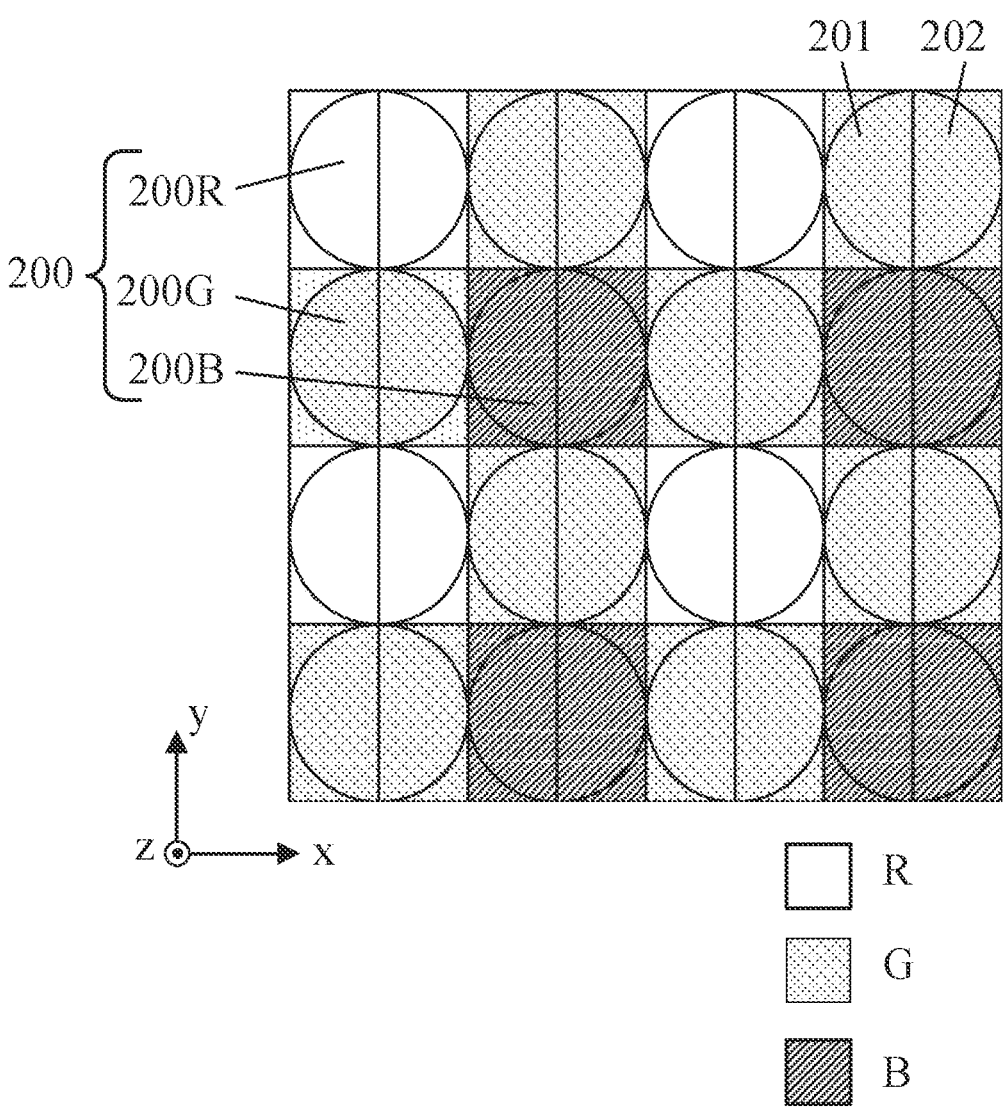
FIG. 2 illustrates a pixel array in the camera according to Example 1.

Referring now to FIG. 2, a description will be given of an image array of the image sensor 107. FIG. 2 illustrates a pixel array of four pixels (in column) extending in the y-direction and four pixels (in row) extending in the x-direction in the image sensor 107 when viewed from the z-direction, which is the optical axis direction.

One pixel unit 200 includes four imaging pixels arranged in 2 rows×2 columns. Arranging a large number of pixel units 200 on the image sensor 107 can provide photoelectric conversion of a two-dimensional object image. In one pixel unit 200, an imaging pixel (referred to as R pixel hereinafter) 200R having R (red) spectral sensitivity is disposed at the upper left, and imaging pixels (referred to as G pixel hereinafter) 200G having G (green) spectral sensitivity are disposed at the upper right and lower left. An imaging pixel (referred to as B pixel hereinafter) 200B having spectral sensitivity of B (blue) is disposed at the lower right. Each imaging pixel includes a first focus detecting pixel 201 and a second focus detecting pixel 202 divided in the horizontal direction (x direction).

In the image sensor 107 according to this example, a pixel pitch P of imaging pixels is 4 m, and the number of imaging pixels N is horizontal (x) 5575 columns×vertical (y) 3725 rows=approximately 20.75 million pixels. A pixel pitch PAF of the focus detecting pixels is 2 μm, and the number of focus detecting pixels NAF is 11150 horizontal columns× 3725 vertical rows=approximately 41.50 million pixels.

In this example, each imaging pixel is divided into two in the horizontal direction, but it may be divided in the vertical direction. The image sensor 107 according to this example has a plurality of imaging pixels each including the first and second focus detecting pixels, but the imaging pixels and the first and second focus detecting pixels may be provided as separate pixels. For example, the first and second focus detecting pixels may be discretely arranged among a plurality of imaging pixels.

Figures 3A, 3B:
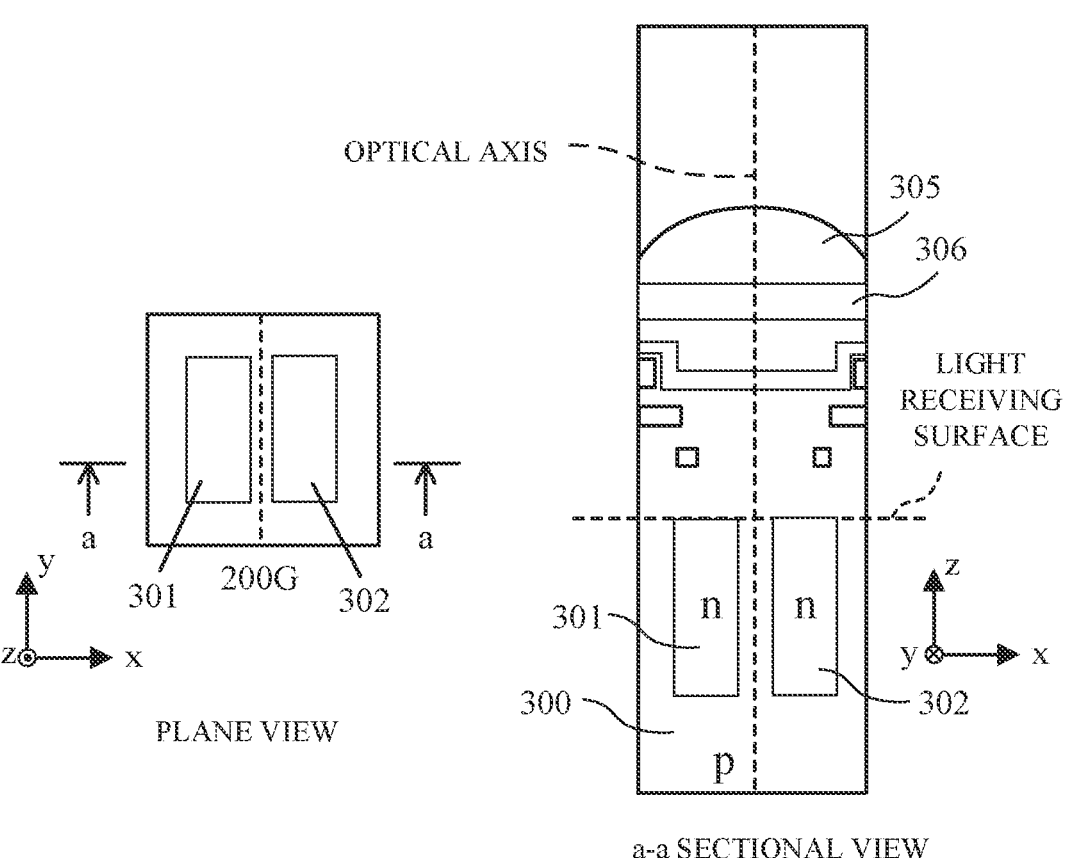
FIGS. 3A and 3B are a plan view and a sectional view of a pixel in Example 1.

FIG. 3A illustrates one imaging pixel (200R, 200G, 200B) viewed from the light receiving surface side (+z direction) of the image sensor 107. FIG. 3B illustrates an a-a section of the imaging pixel illustrated in FIG. 3A viewed from the −y direction. As illustrated in FIG. 3B, one imaging pixel is provided with one microlens 305 for condensing incident light.

The imaging pixel is provided with photoelectric conversion units 301 and 302 divided into N (divided into two in this example) in the x direction. The photoelectric conversion units 301 and 302 correspond to the first focus detecting pixel 201 and the second focus detecting pixel 202, respectively. The centers of gravity of the photoelectric conversion units 301 and 302 are eccentric to the −x side and +x side from the optical axis of the microlens 305, respectively.

An R, G, or B color filter 306 is provided between the microlens 305 and the photoelectric conversion units 301 and 302 in each imaging pixel. The spectral transmittance of the color filter may be changed for each photoelectric conversion unit, or the color filter may be omitted.

The light that has entered the imaging pixel from the imaging optical system is condensed by the microlens 305, separated by the color filter 306, received by the photoelectric conversion units 301 and 302, and photoelectrically converted therein.

Figure 4:
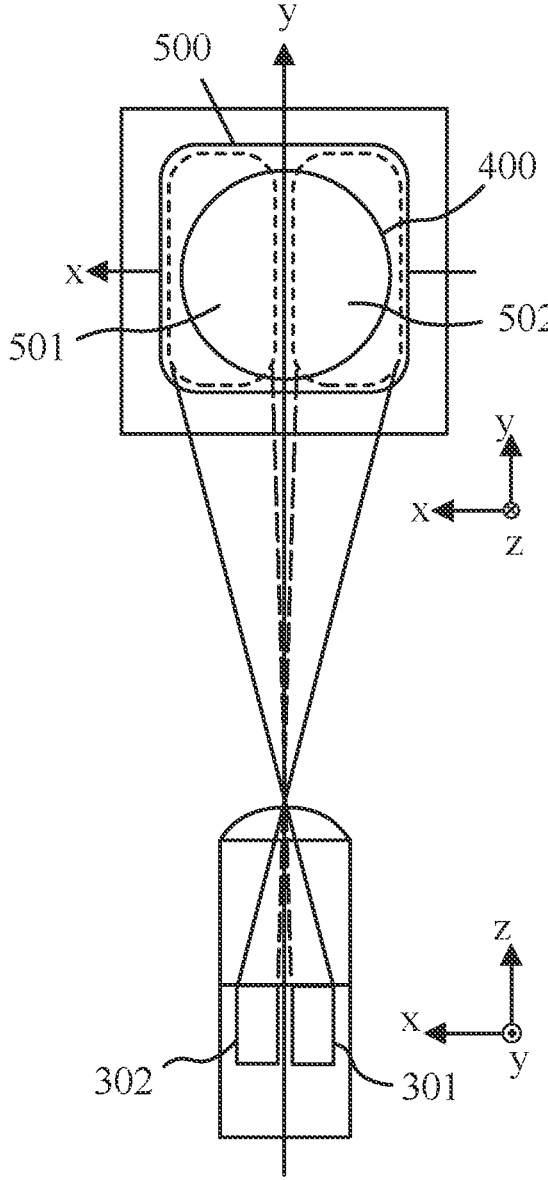
FIG. 4 explains a pixel structure in Example 1.

Referring now to FIG. 4, a description will be given of a relationship between the pixel structure illustrated in FIGS. 3A and 3B and pupil division. FIG. 4 illustrates the a-a section of the imaging pixel illustrated in FIG. 3A viewed from the +y side, and also illustrates the exit pupil of the imaging optical system. In FIG. 4, the x-direction and y-direction of the imaging pixels are reversed with respect to FIG. 3B in order to correspond to the coordinate axes of the exit pupil.

A first pupil area 501 whose center of gravity is eccentric toward the +X side of the exit pupil is an area that has a substantially conjugate relationship with the light receiving surface of the photoelectric conversion unit 301 on the −x side of the imaging pixel by the microlens 305. A light beam that has passed through the first pupil area 501 is received by the photoelectric conversion unit 301, that is, the first focus detecting pixel 201. A second pupil area 502 whose center of gravity is eccentric toward the −X side of the exit pupil is an area that has a substantially conjugate relationship with the light receiving surface of the photoelectric conversion unit 302 on the +x side of the imaging pixel by the microlens 305. A light beam that has passed through the second pupil area 502 is received by the photoelectric conversion unit 302, that is, the second focus detecting pixel 202. A pupil area 500 indicates a pupil area in which light can be received by the entire imaging pixel including the photoelectric conversion units 301 and 302 (first and second focus detecting pixels 201 and 202).

Figure 5:
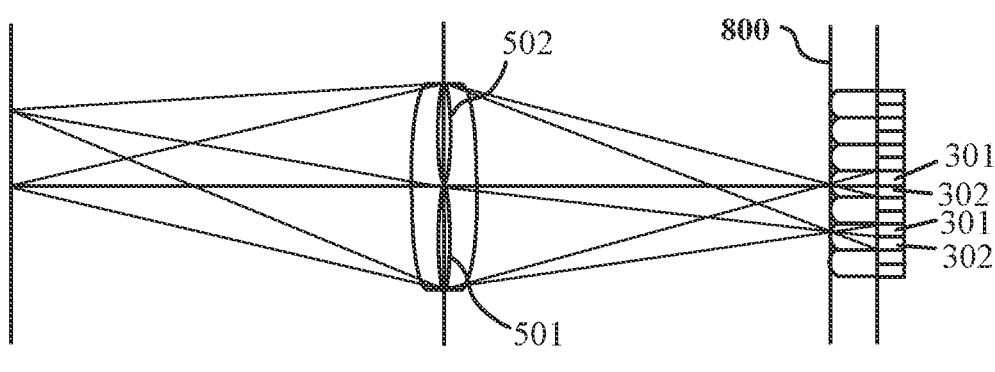
FIG. 5 explains pupil division in Example 1.

FIG. 5 illustrates pupil division by the image sensor 107. A pair of light beams that have passed through the first pupil area 501 and the second pupil area 502 respectively enter each pixel of the image sensor 107 at different angles and are received by the first and second focus detecting pixels 201 and 202 divided into two. This example connects the output signals from the plurality of first focus detecting pixels 201 of the image sensor 107 to generate a first focus detecting signal, and collects the output signals from the plurality of second focus detecting pixels 202 to generate a second focus detecting signal. The output signal from the first focus detecting pixel 201 and the output signal from the second focus detecting pixel 202 of the plurality of image pickup pixels are added to generate an imaging pixel signal. Then, the imaging pixel signals from the plurality of imaging pixels are combined to generate an imaging signal for generating an image with a resolution corresponding to the effective pixel number N.

Figure 6:
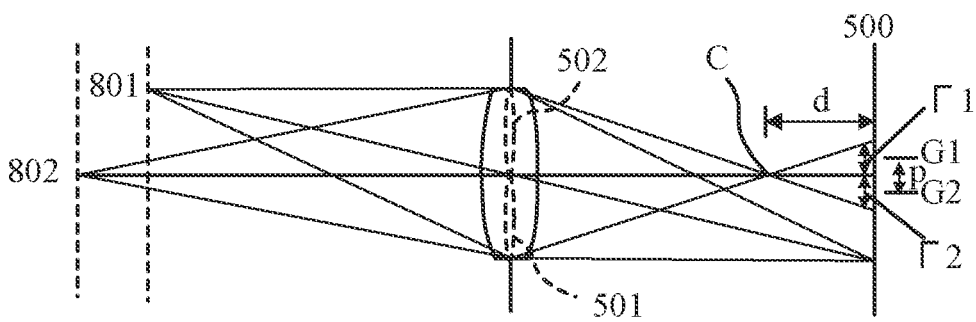
FIG. 6 illustrates a relationship between a defocus amount and an image shift amount in Example 1.

Referring now to FIG. 6, a description will be given of a relationship between a defocus amount of the imaging optical system and a phase difference (image shift amount) between the first focus detecting signal and the second focus detecting signal obtained from the image sensor 107. The image sensor 107 is disposed on an imaging surface 600 in FIG. 6, and as described with reference to FIGS. 4 and 5, the exit pupil of the imaging optical system is divided into the first pupil area 501 and the second pupil area 502. The defocus amount d is represented by a negative sign (d<0) in a front focus state in which an imaging position C is closer to the object than the imaging surface 600, where |d| is a distance (size) from the imaging position C of light beams from objects (801, 802) to the imaging surface 600. In the rear focus state where the imaging surface 600 is closer to the object than the imaging position C, the defocus amount d is represented by a positive sign (d>0). In the in-focus state where the imaging position C is located on the imaging surface 600, d=0. The imaging optical system is in focus (d=0) on the object 801 and in the front focus state with respect to the object 802 (d<0). The front focus state (d<0) and the rear focus state (d>0) are collectively referred to as the defocus state (|d|>0).

In the front focus state (d<0), the light beam that has passed through the first pupil area 501 (the second pupil area 502) among the light beams from the object 802 is once condensed, and then spreads over a width Γ1 (Γ2) around the center of gravity position G1 (G2) of the light beam, and forms a blurred image on the imaging surface 600. This blurred image is received by each first focus detecting pixel 201 (each second focus detecting pixel 202) on the image sensor 107, and a first focus detecting signal (second focus detecting signal) is generated. That is, the first focus detecting signal (second focus detecting signal) is a signal representing an object image in which the object 802 is blurred by the blur width Γ1 (Γ2) at the center of gravity position G1 (G2) of the light beam on the imaging surface 600.

The blur width Γ1 (Γ2) of the object image increases approximately in proportion to the increase in the magnitude |d| of the defocus amount d. Similarly, the magnitude |p| of the image shift amount p between the first focus detecting signal and the second focus detecting signal (=difference G1−G2 between the centers of gravity positions of the light beams) also increases roughly in proportion to the increase in the magnitude |d| of the defocus amount d. Even in the rear focus state (d>0), the image shift direction between the first focus detecting signal and the second focus detecting signal is opposite to that in the front focus state but is similar.

Thus, as a defocus amount increases, an image shift amount between the first and second focus detecting signals increases. This example performs imaging-surface phase-difference detection type focus detection in which the defocus amount is calculated from the image shift amount between the first and second focus detecting signals obtained using the image sensor 107.

Figure 7:
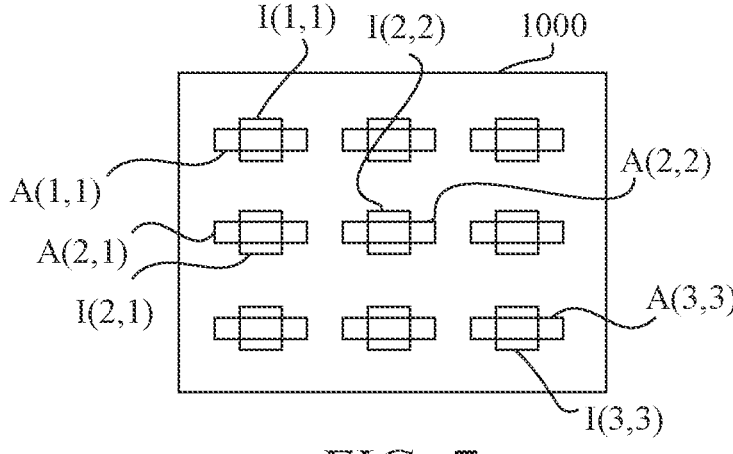
FIG. 7 illustrates a focus detecting area in Example 1.

Referring now to FIG. 7, a description will be given of a focus detecting area for acquiring the first and second focus detecting signals of the image sensor 107. In FIG. 7, A(n, m) indicates the n-th focus detecting area in the x direction and the m-th focus detecting area in the y direction among a plurality of focus detecting areas (three in the x direction and three in the y direction, total nine) set in the effective pixel area 1000 of the image sensor 107. The first and second focus detecting signals are generated from output signals from the plurality of first and second focus detecting pixels 201 and 202 included in the focus detecting area A(n, m). I(n, m) indicates an index for displaying the position of the focus detecting area A(n, m) on the display unit 131.

The nine focus detecting areas illustrated in FIG. 7 are merely illustrative, and the number, positions, and sizes of the focus detecting areas are not limited. For example, one or more areas may be set as the focus detecting area within a predetermined range centered on the position specified by the user or the position of the object detected by the object detector 140. This example arranges the focus detecting areas so that focus detecting results can be obtained with higher resolution in defocus map acquisition, which will be described below. For example, the image sensor has 120 horizontal divisions and 80 vertical divisions or a total of 9600 focus detecting areas.

Figure 8:
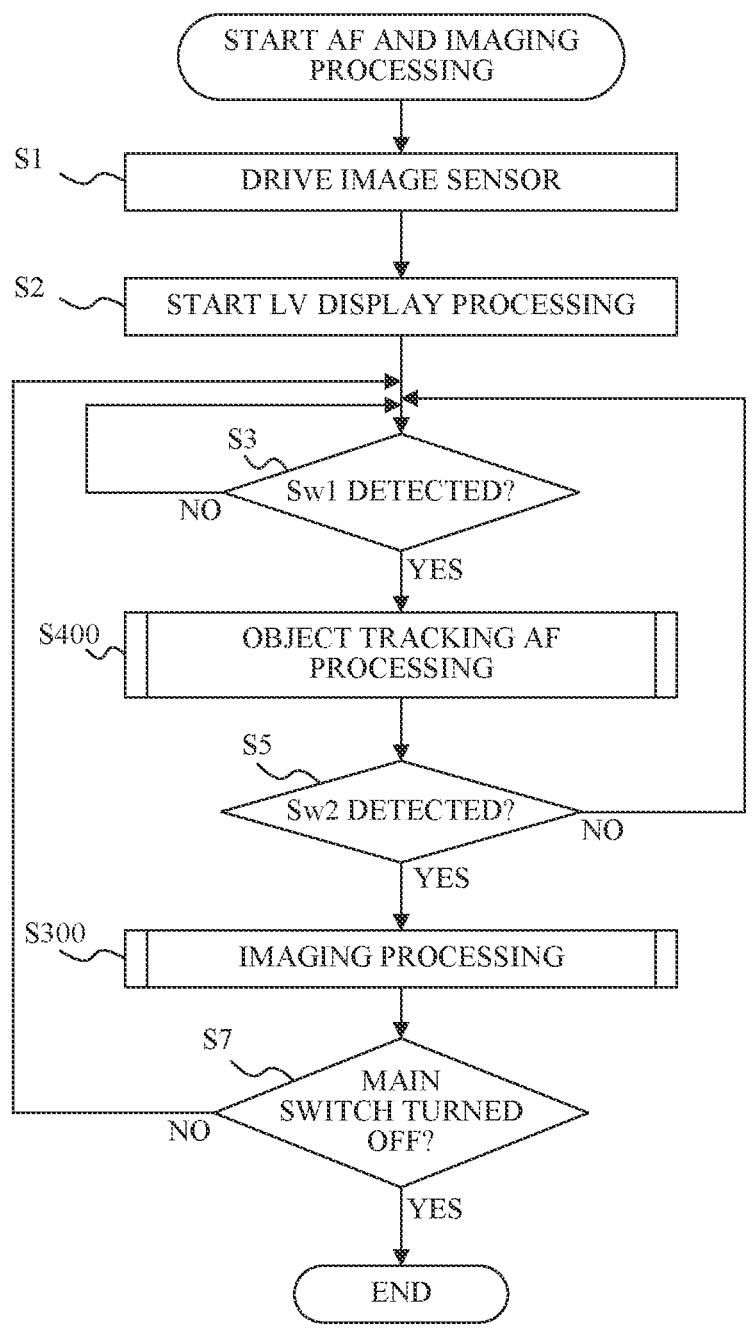
FIG. 8 is a flowchart illustrating AF and imaging processing according to Example 1.

A flowchart in FIG. 8 illustrates AF and imaging processing (image processing method) executed by the camera 100 according to this example. More specifically, it illustrates processing for performing an operation from a pre-imaging state for displaying a live-view (LV) image on the display unit 131 of the camera 100 to still image imaging. The camera CPU 121, which is a computer, executes this processing according to a computer program. In the following description, S stands for the step.

First, in S1, the camera CPU 121 causes the image sensor driving circuit 124 to drive the image sensor 107 and acquires imaging data from the image sensor 107. Thereafter, the camera CPU 121 acquires first and second focus detecting signals from the plurality of first and second focus detecting pixels included in each of the plurality of focus detecting areas illustrated in FIG. 7 among the obtained imaging data. The camera CPU 121 adds the first and second focus detecting signals of all effective pixels of the image sensor 107 to generate an imaging signal, and causes the image processing circuit 125 to perform image processing for the imaging signal (imaging data) and acquire image data. In a case where the imaging pixels and the first and second focus detecting pixels are provided separately, the camera CPU 121 performs interpolation processing for the focus detecting pixels to obtain image data.

Next, in S2, the camera CPU 121 causes the image processing circuit 125 to generate a live-view image from the image data obtained in S1, and causes the display unit 131 to display it. The live-view image is a reduced image that matches the resolution of the display unit 131, and the user can adjust the imaging composition, exposure condition, etc. while viewing the live-view image. Therefore, the camera CPU 121 adjusts the exposure based on the photometric value obtained from the image data and displays it on the display unit 131. The exposure adjustment is realized by properly adjusting the exposure time, opening and closing of the aperture opening of the imaging lens, and gain control over the output from the image sensor 107.

Next, in S3, the camera CPU 121 determines whether or not a switch Sw1 instructing the start of the imaging preparation operation has been turned on by a half-pressing operation of the release switch included in the operation switches 132 by the user. In a case where Sw1 is not turned on, the camera CPU 121 repeats the determination of S3 in order to monitor the timing at which Sw1 is turned on. On the other hand, in a case where Sw1 is turned on, the flow proceeds to S400 to perform object tracking AF processing. Here, based on the obtained imaging signal and focus detecting signal, object area detection, focus detecting area setting, predictive AF processing for suppressing the influence of the time lag from focus detection to imaging, and the like are performed. Details of the object tracking AF processing will be described below.

Next, in S5, the camera CPU 121 determines whether or not a switch Sw2 for instructing the start of the imaging operation has been turned on by a fully pressing operation of the release switch by the user. The camera CPU 121 returns to S3 in a case where Sw2 is not turned on. On the other hand, in a case where Sw2 is turned on, the flow proceeds to S300 to execute the imaging processing. Details of the imaging processing will be described below. In a case where the imaging processing ends, the flow proceeds to S7.

In S7, the camera CPU 121 determines whether or not the main switch included in the operation switches 132 has been turned off. The camera CPU 121 ends this processing in a case where the main switch is turned off, and returns to S3 in a case where the main switch is not turned off.

This example performs the object detection processing and the AF processing after turning on of Sw1 is detected in S3, but the timing of the processing is not limited to this example. The object tracking AF processing in S400 performed before Sw1 is turned on can eliminate the need for the preliminary operation of the user before imaging.

Figure 9:
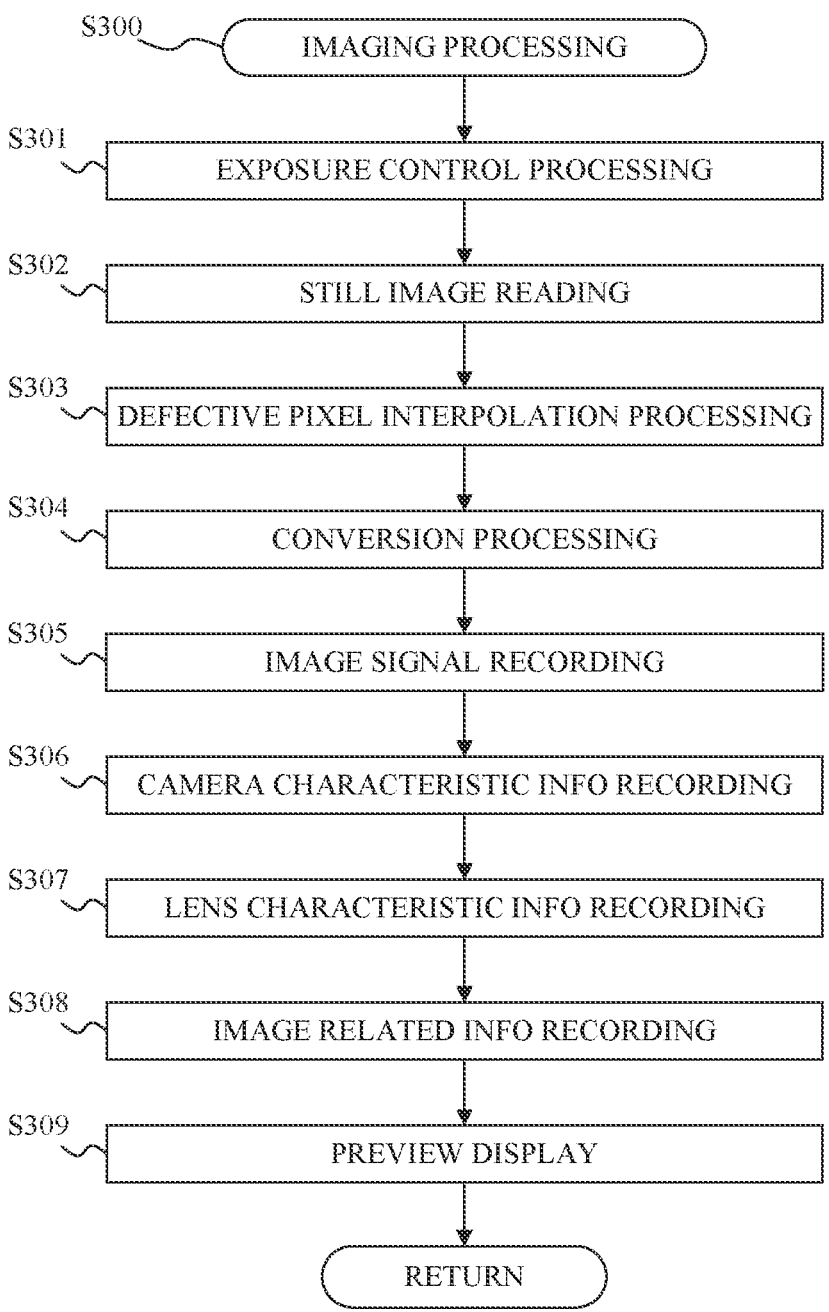
FIG. 9 is a flowchart for explaining imaging processing according to Example 1.

A description will now be given of the imaging processing executed by the camera CPU 121 in S300 of FIG. 8 using a flowchart illustrated in FIG. 9.

In S301, the camera CPU 121 performs exposure control processing and determines the imaging condition (shutter speed, F-number (aperture value), imaging sensitivity, etc.). This exposure control processing can be performed using luminance information acquired from image data of a live-view image. The camera CPU 121 transmits the determined aperture value to the aperture driving circuit 128 to drive the aperture stop 102. The camera CPU 121 transmits the determined shutter speed to the shutter 108 to open the shutter 108. The camera CPU 121 causes the image sensor 107 to perform charge accumulation during the exposure period through the image sensor driving circuit 124.

The camera CPU 121 that has performed the exposure control processing causes the image sensor driving circuit 124 to read out all pixels of the imaging signal for capturing a still image from the image sensor 107 in S302. The camera CPU 121 also causes the image sensor driving circuit 124 to read one of the first and second focus detecting signals from the focus detecting area (focusing target area) in the image sensor 107. The first or second focus detecting signals read at this time are used to detect the focus state of the image during image playback, which will be described below. By subtracting one of the first and second focus detecting signals from the imaging signal, the other focus detecting signal can be obtained.

Next, in S303, the camera CPU 121 causes the image processing circuit 125 to perform defective pixel interpolation processing for the imaging data read out and A/D converted in S302.

Next, in S304, the camera CPU 121 causes the image processing circuit 125 to perform image processing and encoding processing, such as demosaicing (color interpolation) processing, white balance processing, γ correction (gradation correction) processing, color conversion processing, and edge enhancement processing, for the captured data that has undergone the defective pixel correction processing.

Next, in S305, the camera CPU 121 records still image data as image data obtained by the image processing and encoding processing in S304 and one of the focus detecting signals read out in S302 in the memory 133 as an image data file.

Next, in S306, the camera CPU 121 records camera characteristic information, which is information indicating the characteristics of the camera 100, in the memory 133 and the memory inside the camera CPU 121 in association with the still image data recorded in S305. The camera characteristic information includes, for example, imaging condition (aperture value, shutter speed, imaging sensitivity, etc.), information on image processing performed by the image processing circuit 125, information on the light sensitivity distribution of the imaging pixels and focus detecting pixels on the image sensor 107, information on light shielding of imaging light beams in camera 100, information on a distance from an attachment surface of the imaging optical system in the camera 100 to the image sensor 107, and information on manufacturing errors of the camera 100.

Information on the light sensitivity distribution of the imaging pixels and focus detecting pixels (simply referred to as light receiving sensitivity distribution information hereinafter) is sensitivity information of the image sensor 107 according to a distance (position) from the image sensor 107 on the optical axis. Since this light receiving sensitivity distribution information depends on the microlens 305 and the photoelectric conversion units 301 and 302, it may be information on them. The light receiving sensitivity distribution information may also be information on changes in sensitivity against the incident angle of light.

Next, in S307, the camera CPU 121 records lens characteristic information, which is information indicating the characteristics of the imaging optical system, in the memory 133 and the memory inside the camera CPU 121 in association with the still image data recorded in S305. The lens characteristic information includes, for example, information on an exit pupil, information on a frame such as a lens barrel which shields a light beam, information on a focal length and F-number during imaging, information on the aberration of the imaging optical system, information on the manufacturing error of the imaging optical system, and information on the position of the focus lens 105 (object distance) during imaging.

Next, in S308, the camera CPU 121 records image-related information as information about still image data in the memory 133 and the memory inside the camera CPU 121. The image-related information includes, for example, information on a focus detecting operation before imaging, information on object movement, and information on focus detecting accuracy.

Next, in S309, the camera CPU 121 displays a preview of the captured image on the display unit 131. Thereby, the user can easily check a captured image. In a case where the processing of S309 ends, the camera CPU 121 ends the main imaging subroutine and the flow proceeds to S7 in FIG. 8.

A description will now be given of the object tracking AF processing executed by the camera CPU 121 in S400 of FIG. 8 using a flowchart illustrated in FIG. 10.

In S401, the camera CPU 121 calculates an image shift amount between the first and second focus detecting signals obtained in each of the plurality of focus detecting areas acquired in S1, and calculates a defocus amount for each focus detecting area from the image shift amount. As described above, in this example, a group of focus detection results (defocus amounts) obtained from a total of 9600 focus detecting areas arranged on the image sensor 107 with 120 horizontal divisions and 80 vertical divisions is referred to as a defocus map.

Next, in S402, the camera CPU 121 causes the object detector 140 to perform object detection processing and object tracking processing. Depending on the state of the obtained image data, an object may be undetectable in it. In such a case, the object tracking processing using other means such as template matching is performed to estimate an object position. Details of the object detection processing will be described below.

Next, in S403, the camera CPU 121 causes the object detector 140 to perform personal authentication (authentication processing) by determining whether or not the face of a person present in the image data is the face of the person registered in the dictionary data. In this example, an authenticated object is prioritized over "an object that is determined to be an object that is likely to be a main object based on orientation information" described below. Therefore, the authentication processing is performed prior to the processing of determining that the object is likely to be the main object based on the orientation information (main object determination processing).

Figures 11A, 11B:
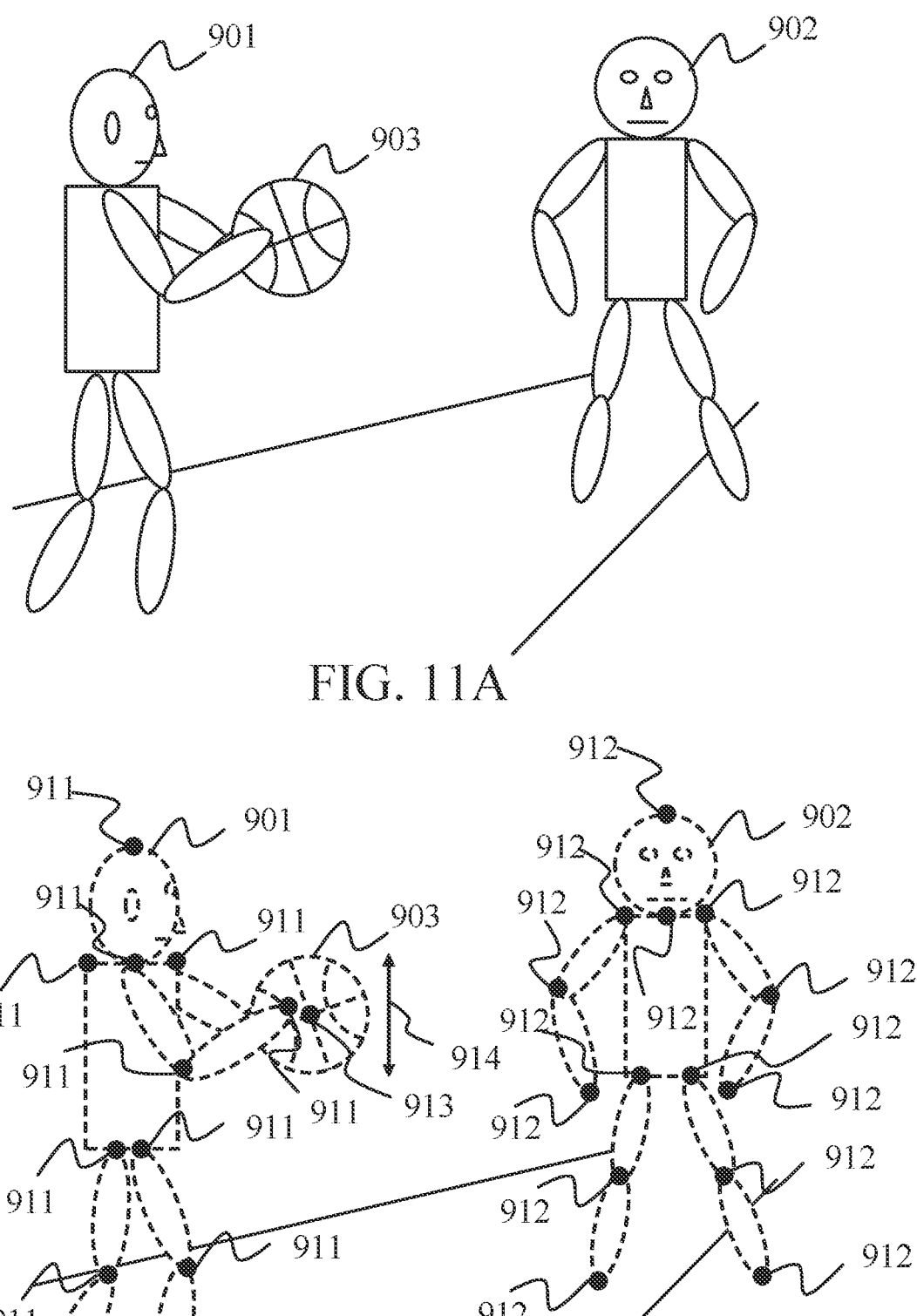
FIGS. 11A and 11B explain orientation (attitude) information in Example 1.

Next, in S404, the camera CPU 121 causes the orientation acquiring unit 142 to acquire the orientation information from joint positions of each of the plurality of objects detected by the object detector 140. FIG. 11A illustrates image data of a target for which orientation information is to be acquired. An object 901 playing basketball is catching a ball 903 and is an important object in the imaging scene. This example determines the object that is highly likely to be intended by the user to be focused (to be imaged), using the orientation information of the object. On the other hand, an object 902 is an object (non-main object) other than the object that the user intends to focus on.

FIG. 11B illustrates an example of orientation information of the objects 901 and 902 and the position and size of the ball 903. Joints 911 represent joints of the object 901, and joints 912 represent joints of the object 902. FIG. 11B illustrates an example of acquiring the positions of the top of the head, neck, shoulders, elbows, wrists, hips, knees, and ankles as joints. However, the joints may be a part of them or may include another joint. The orientation information may be information indicating a position and tilt of an axis connecting the joints as well as information on the positions of these joints, or may be various information representing the orientation of the object. Here, the orientation information uses joint position information.

The orientation acquiring unit 142 acquires two-dimensional coordinates (x, y) of the joints 911 and 912 in the image data. The units of (x, y) are pixels. A center-of-gravity position 413 represents the center-of-gravity position of the ball 903, and an arrow 914 represents the size (diameter) of the ball 903. The orientation acquiring unit 142 acquires the two-dimensional coordinates (x, y) of the center-of-gravity position of the ball 903 in the image data and the number of pixels indicating the diameter of the ball 903.

Next, in S405, the camera CPU 121 performs main object determination processing. More specifically, using the defocus map acquired in S401, the result of the object detection processing performed in S402, the result of the authentication processing performed in S403, and the orientation information acquired in S404, the main object is determined from among the plurality of detected objects. The main object here is an object to be focused. The main object includes an object that the user intends to focus on, and an object to be focused (such as the ball 903) in a case where there is no object that the user intends to focus on. Details of the main object determination processing will be described below.

Next, in S406, the camera CPU 121 sets the focus detecting area using an area for detecting the main object determined in S405 in the image data (referred to as an object area hereinafter). More specifically, from the focus detection result in the focus detecting areas within the object area, a focus detection result for an object located at a distance on the close side with higher reliability is selected. Alternatively, a focus detecting signal may be acquired by rearranging the focus detecting areas within the object area, and the focus detection result may be selected in the same manner.

Next, in S407, the camera CPU 121 acquires the focus detection result of the set focus detecting area. At this time, a focus detection result close to a desired object area may be selected from the focus detection result calculated in S401, or a defocus amount may be calculated using a focus detecting signal corresponding to a newly set focus detecting area. The number of focus detecting areas for which the defocus amount is calculated is not limited to one and may be plural.

Next, in S408, the camera CPU 121 performs predictive AF processing using a defocus amount as the focus detection result obtained in S406 and a plurality of defocus amounts obtained as time-series data from past focus detection. The predictive AF processing is necessary processing in a case where there is a time lag between the focus detection timing and the timing of exposure for acquiring a captured image (imaging exposure timing). The predictive AF processing performs AF control by predicting an image plane position of an object in the optical axis direction at the imaging exposure timing a predetermined time after the focus detection timing. The predictive AF processing obtains, for example, a prediction curve by multivariate analysis (e.g., least squares method) using historical data indicating the past image plane position of the object and its time, and calculates the predicted image plane position of the object by substituting the time of the imaging exposure timing into the obtained prediction curve equation.

The image plane position of the object may be predicted not only in the optical axis direction but also in the three-dimensional direction. The horizontal and vertical directions of the image data are set to the X and Y directions, and the optical axis direction is set to the Z direction. At this time, the image plane position of the object at the imaging exposure timing may be predicted from the XY position of the object obtained in the object detection and tracking processing in S402 and the time-series data of the Z position obtained from the defocus amount obtained in S407. The image plane position of the object may be predicted from the time-series data of the joint positions of the person as the object.

The predictive AF processing can estimate the position of the ball or person even if the ball or person is hidden or part of the person's joints becomes invisible while the imaging continues. The image plane position is predicted performed not only for the main object but also for each of a plurality of detected objects. This example performs predictive AF processing for a person and a ball other than a person. The predictive AF processing may be performed for a person using the focus detection result corresponding to the joint positions acquired in S404.

Next, in S409, the camera CPU 121 calculates a driving amount of the focus lens using the result of the main object determination processing in S404, the defocus amount obtained in S407, and the result of the predicted AF processing in S408. Then, the camera CPU 121 outputs a focus driving command including the driving amount to the focus driving circuit 126 to drive the focus actuator 114 and move the third lens unit 105 in the optical axis direction for focusing processing. Details of the focusing processing will be described below. In a case where the processing of S409 ends, the camera CPU 121 ends the object tracking AF processing and proceeds to S5 in FIG. 8.

Figure 12:
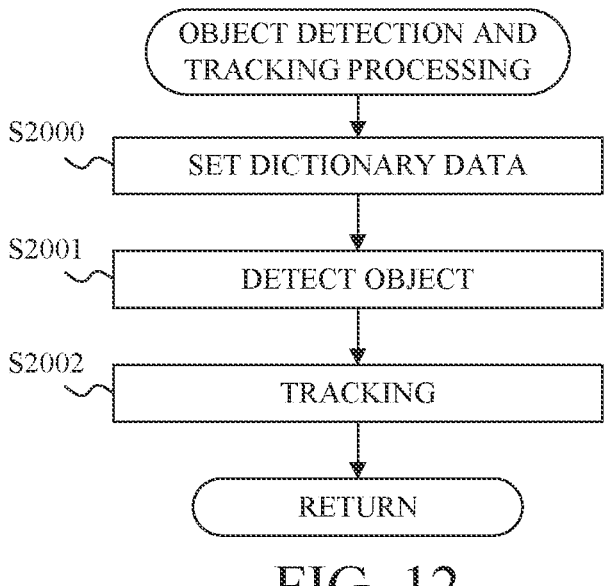
FIG. 12 is a flowchart illustrating object detection and tracking processing according to Example 1.

A description will now be given of the object detection and tracking processing executed by the camera CPU 121 in S402 of FIG. 10 using a flowchart illustrated in FIG. 12.

In S2000, the camera CPU 121 sets dictionary data according to the type of the object to be detected from the image data acquired in S1. The dictionary data to be used in this processing is selected from a plurality of dictionary data stored in the dictionary data memory 141 based on the preset priority of the object and the settings of the camera 100. The plurality of dictionary data are stored according to the type of the object such as "person," "vehicle," and "animal." One or more dictionary data may be selected. In a case where one dictionary data is selected, an object corresponding to the one dictionary data can be repetitively detected at a high frequency. On the other hand, in selecting a plurality of dictionary data, the objects can be sequentially detected by sequentially setting the dictionary data according to the priority of the object.

Next, in S2001, the camera CPU 121 causes the object detector 140 to perform object detection using the image data read out in S1 as an input image and the dictionary data set in step S2000, thereby acquiring an object area. This example sets dictionary data of "person" and "ball." At this time, the object detector 140 outputs information such as the position, size and reliability of the detected object. The camera CPU 121 may cause the display unit 131 to display the information output by the object detector 140.

In S2001, the camera CPU 121 causes the object detector 140 to hierarchically detect a plurality of areas relating to a person from an input image. For example, in a case where a "person" is set as dictionary data, a plurality of organs such as a "whole body" area, a "face" area, and an "eye" area are detected. A local area such as a person's eyes or face is an area to be focused and exposed as an object, but may not be detected due to surrounding obstacles or face orientation. Even in such a case, the object is hierarchically detected so that the object can be robustly and continuously detected by detecting the whole body.

In S2001, after the person is detected, the dictionary data to be used is changed to the "ball" dictionary data and a ball is detected. In detecting a ball, the area of the entire ball is detected, and the center position and size of the ball are output. If the "object detection" dictionary data is provided instead of the "ball" dictionary data, the ball may be detected as one type of object detection. Any object detection method may be used, and for example, the method described in Redmon, Joseph, et al., "You only look once: Unified, real-time object detection.", Proceedings of the IEEE conference on computer vision and pattern recognition, 2016, can be used. Although the object is a ball in this example, the object may be another object such as a racket.

Next, in S2002, the camera CPU 121 performs tracking processing by template matching using the object area obtained in S2001 as a template. More specifically, the camera CPU 121 uses an object area obtained from past image data among the plurality of image data obtained in S1 as a template and searches for similar areas in the last (just previously obtained) image data. The template matching can use luminance information, color histogram information, feature point information such as corners and edges, and the like. Any method may be used as a matching method or a template updating method. The tracking processing performed in S2002 is performed to realize stable object detection and tracking processing by detecting an area similar to the past object area from the last image data in a case where the object is not detected in S2001. In a case where the tracking processing in S2002 is finished in this way, this flow ends and proceeds to S403 in FIG. 10.

Figure 13:
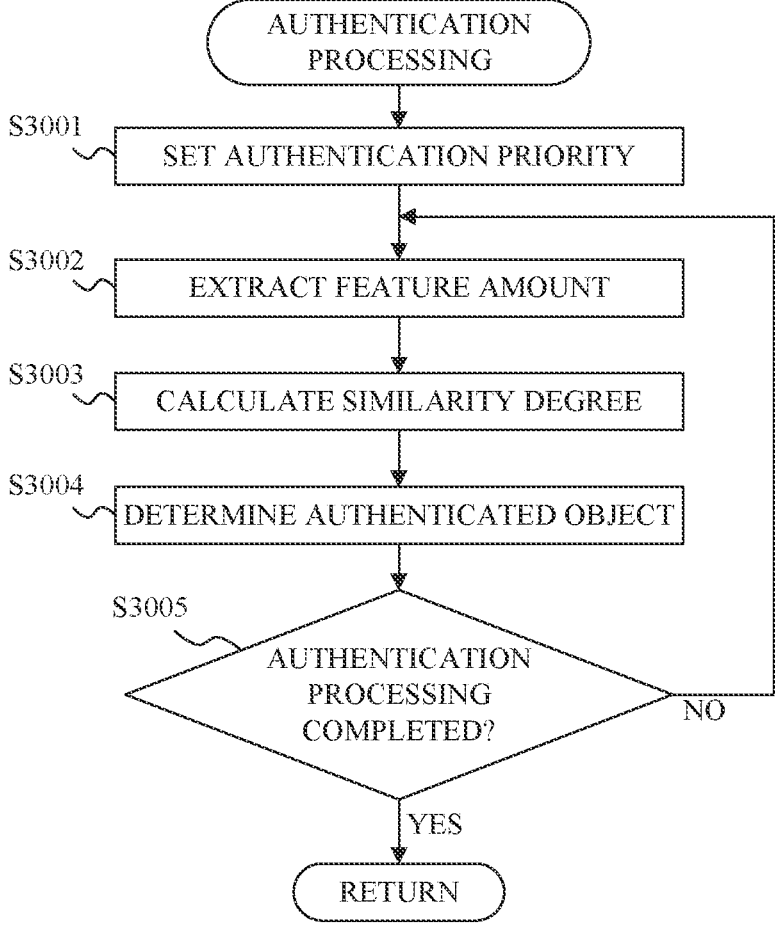
FIG. 13 is a flowchart illustrating authentication processing according to Example 1.

A description will now be given of the authentication processing executed by the camera CPU 121 and the object detector 140 in S405 of FIG. 10 using a flowchart illustrated in FIG. 13.

In S3001, the camera CPU 121 sets the priority of dictionary data in which faces of a plurality of persons are previously registered. Here, in a case where a plurality of faces are detected (authenticated), the priority is set for determining which face of a person is to be the main object. The camera CPU 121 may automatically set the priority according to the size and position of the person's face, or the user may previously set the priority.

Next, in S3002, the object detector 140 extracts a feature amount of the person's face by detecting organs such as the eye and mouth of the person in the image data.

Next, in S3003, the object detector 140 calculates the similarity (second reliability, second evaluation value) between the feature amount extracted in S3002 and the feature amount of the face previously registered in the dictionary data, using pattern matching or the like. At this time, the similarity is the similarly with the feature amount of the dictionary data with the high priority set in S3001.

Next, in S3004, the camera CPU 121 determines an authenticated object. More specifically, the camera CPU 121 determines whether or not the similarity calculated in S3003 is equal to or higher than the second threshold. This example determines the main object using the result of comparison between the similarity and the second threshold.

Next, in S3005, the camera CPU 121 determines whether extraction of a feature amount (S3001), calculation of similarity of the feature amount (S3003), and authenticated object determination (S3004) have been completed for each of a plurality of faces detected by object detection. If so, the camera CPU 121 ends the authentication processing and the flow proceeds to S404 in FIG. 10. If not completed, the flow returns to S3002.

Figure 14:
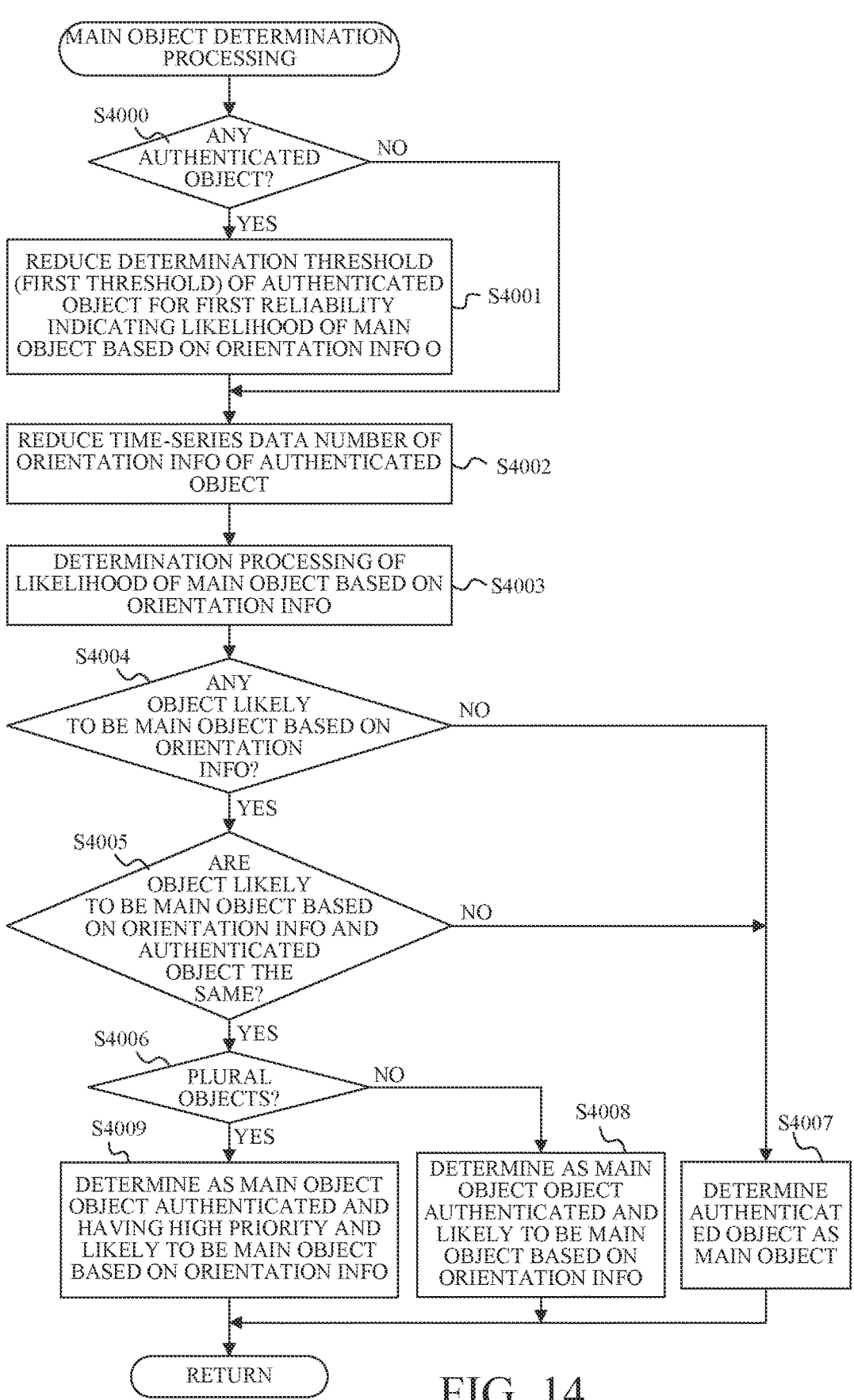
FIG. 14 is a flowchart illustrating main object determination processing according to Example 1.

A description will now be given of the main object determination processing executed by the camera CPU 121 in S405 of FIG. 10 using a flowchart illustrated in FIG. 14. This example will discuss the way of determining the main object in a case where there are two methods for detecting the object, namely, a method based on authentication processing and a method based on orientation information, which will be described below. As described above, this example gives priority to the authenticated object over "the object that is determined to be an object that is likely to be a main object based on the orientation information."

Figure 10:
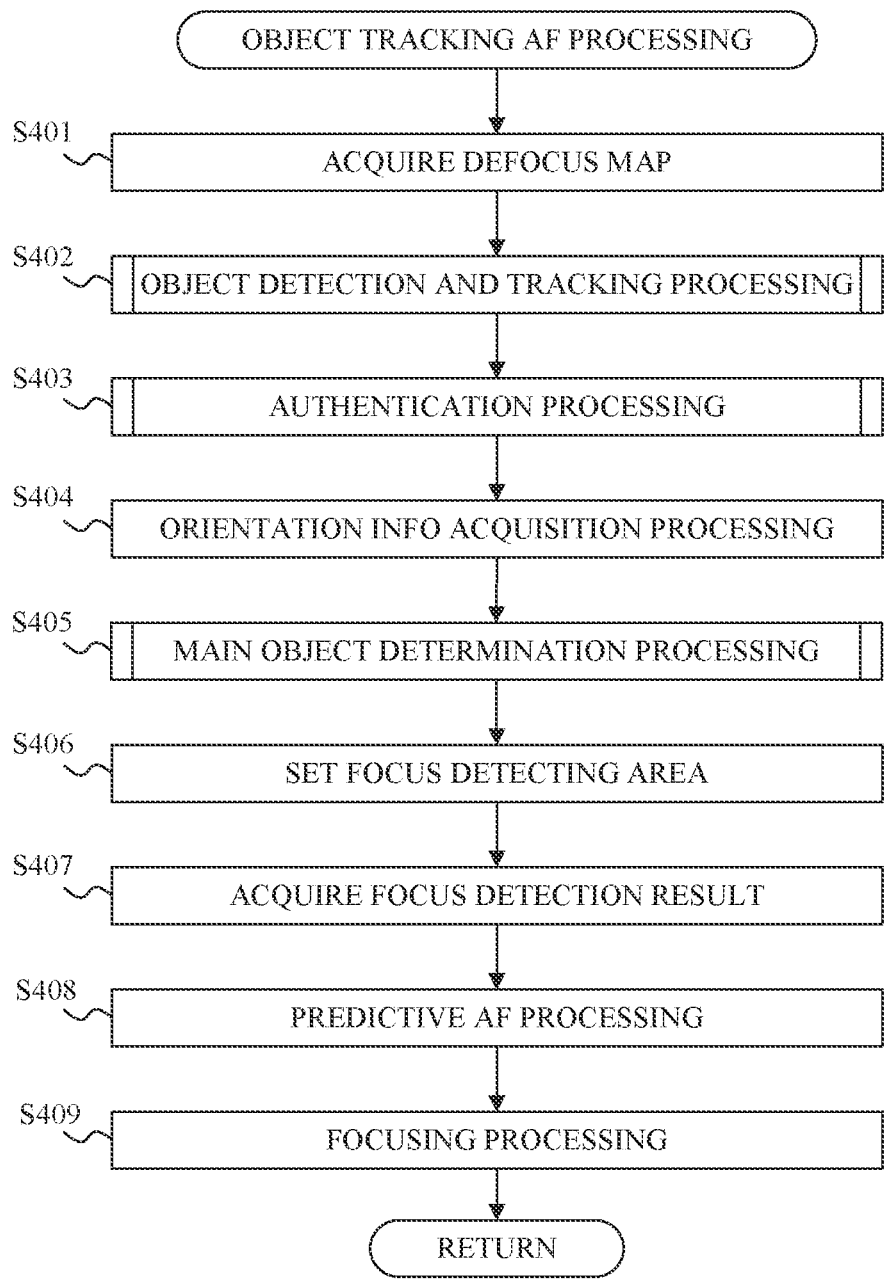
FIG. 10 is a flowchart illustrating object tracking AF processing according to Example 1.

In S4000, the camera CPU 121 determines whether or not there is an authenticated object detected by the authentication processing in S403 of FIG. 10. In a case where the authenticated object exists, the flow proceeds to S4001, and in a case where the authenticated object does not exist, the flow proceeds to S4002.

In S4001, the camera CPU 121 sets the first threshold for determining the main object based on the first reliability (first evaluation value) indicating the likelihood of the main object based on the orientation information, to be smaller than that in a case where there is no authenticated object. This example determines the main object using a comparison result between the first reliability and the first threshold.

A description will now be given of a method for calculating the first reliability. The first reliability in this example is a probability indicating the degree of possibility that the object is the main object in the image data to be processed. However, the first reliability may use a value other than probability, such as a reciprocal of a distance between the center-of-gravity position of the object obtained from the orientation information and the center-of-gravity position of a peculiar object.

Probability Calculating Method

A description will be given of a method for calculating the probability indicating a likelihood of a main object based on the coordinates of the joints and the coordinates and size of the ball. A case of using a neural network, which is one of machine learning methods, will be described below.

Figure 15:
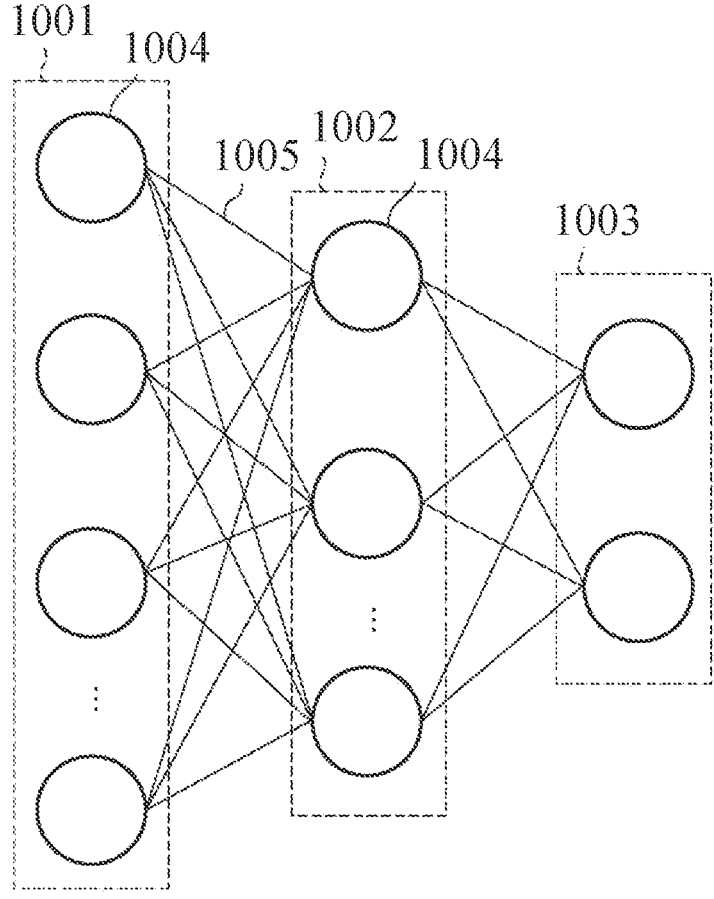
FIG. 15 illustrates a neural network structure according to Example 1.

FIG. 15 illustrates an structural example of a neural network. In FIG. 15, reference numeral 1001 denotes an input layer, reference numeral 1002 denotes an intermediate layer, and reference numeral 1003 denotes an output layer. Reference numeral 1004 denotes neurons included in each layer. Lines 1005 represent connections between the neurons 1004. Assume that the number of neurons 1004 in the input layer 1001 is equal to the dimension of input data, and the number of neurons in the output layer 1003 is two. This corresponds to the problem of two-class classification to determine the likelihood of the main object.

A weight wij is given to the line 1005 connecting the i-th neuron 1004 of the input layer 1001 and the j-th neuron 1004 of the intermediate layer 1002. A value zj output by the j-th neuron 1004 in the intermediate layer 1002 is given by the following equations (1) and (2):

$$z_j = h\left(b_j + \sum_i w_{ji} x_i\right) \tag{1}$$

$$h(z) = \max(z, 0) \tag{2}$$

In equation (1), xi represents a value input to the i-th neuron 1004 of the input layer 1001. The products of wij and xi for all neurons 1004 in the input layer 1001 connected to the j-th neuron are summed up. bj is called a bias and is a parameter that controls how easily the j-th neuron 1004 fires. A function h defined by equation (2) is an activation function called ReLU (Rectified Linear Unit). Another function such as a sigmoid function can be used as the activation function.

A value yk output by a k-th neuron 504 of the output layer 1003 is given by the following equations (3) and (4):

$$y_k = f\left(b_k + \sum_j w_{kj} z_j\right) \tag{3}$$

$$f(y_k) = \frac{\exp(y_k)}{\sum_i \exp(y_i)} \tag{4}$$

In equation (3), zj represents a value output from the j-th neuron 1004 of the intermediate layer 1002, i, k=0, 1. 0 corresponds to a non-main object, and 1 corresponds to a main object. The products of wkj and zj for all neurons in the hidden layer 1002 connected to the k-th neuron are summed up. A function f defined by equation (4) is called a softmax function, and outputs a probability value belonging to the k-th class. This example uses f(y1) as the probability (first reliability) representing the likelihood of the main object.

During learning the neural network, the coordinates of the person's joints and the coordinates and size of the ball are input. All weights and biases are then optimized to minimize a loss function using the probability to be output and ground truth (correct) label. The ground truth label consists of binary values, and this example sets an object that is likely to be a main object to "1," and set an object that is unlikely to be a main object to "0." The loss function L can use binary cross-entropy as represented by the following equation (5):

$$L(y, t) = -\sum_m t_m \log y_m - \sum_m (1 - t_m) \log(1 - y_m) \tag{5}$$

In equation (5), a subscript m represents an index of an object to be learned. ym represents a probability value output from the k=1 neuron 504 in the output layer 1003, and tm represents a ground truth label. The loss function may use any function that can measure the matching degree with the ground truth label, such as the mean square error other than the binary cross-entropy of equation (5). Optimizing the weights and biases using the loss function L can determine the weights and biases so that the ground truth label and the probability value to be output are close to each other. The learned weights and bias values are previously stored in the flash memory 133 and stored in the RAM within the camera CPU 121, as necessary. A plurality of types of weights and bias values may be prepared according to the imaging scene. A probability value f(y1) is output using the learned weights and biases as a result of previously performed machine learning and equations (1) to (4).

In learning, a state prior to moving to an important action can be learned as a state of a likelihood of a main object. For example, in an imaging scene in which a person throws a ball, a state in which the hand that throws the ball is extended forward can be learned as one state indicating a likelihood of a main object. The reason for adopting this configuration is that the camera CPU 121 needs to perform proper control in a case where an action in which the likelihood of the main object takes important action. For example, in a case where the first reliability corresponding to the likelihood of the main object is equal to or higher than the first threshold, the camera CPU 121 automatically starts control to record image data, thereby enabling the user to capture an important moment without missing a photo opportunity. At this time, the information on the typical time from the learning target state to the important action may be used for control of the camera CPU 121.

In addition to the probability calculating method using the neural network described above, other machine learning methods such as support vector machines and decision trees may be used as long as they can classify a likelihood of a main object. In addition to the machine learning, a function may be used that outputs a reliability or probability value based on a certain model. By assuming that a person who is closer to a ball is more likely to be (more reliable as) a main object, a value of a monotonically decreasing function against a distance between the person and the ball can be used.

This example determines whether the object is likely to be the main object (calculates the first reliability) using ball information, but can determine whether the object is likely to be the main object using only the orientation information of the object. Depending on the type of orientation information of the object (for example, pass or shot), it may or may not be better to use ball information as well. For example, in case of shooting, a distance between the person and the ball increases. However, the user may wish to use the shot object as the main object, the likelihood of the main object may be determined based only on the orientation information of the person who is the object without depending on the ball, or the likelihood of the main object may be determined by selectively using ball information according to the type of orientation information of the object.

The likelihood of the main object may be determined using data obtained by performing a predetermined transformation such as linear transformation for the coordinates of the joints and the coordinates and size of the ball as input data. In a case where an object that is likely to be a main object is frequently switched between two objects having a defocus amount difference, an object different from the user's intention may become a main object. In such a case, frequent switching of an object that is likely to be a main object is detected from time-series data of the first reliability of each object, and the switching may be prevented by increasing the first reliability of one of the two objects (for example, the object on the closest side). An area including two objects may be treated as an area of an object that is likely to be a main object.

Another method can determine whether an object is a main object using orientation information of a person, positions of the person and a ball, a defocus amount of each object, and time-series data of the first reliability as input data. The prediction processing of the image plane position of the object described above may be performed, and data obtained by predicting the coordinates of the joints of the person and the coordinates and size of the ball at the imaging exposure timing may be used as input data to determine whether the object is likely to be the main object. Whether or not to use data for which the prediction processing has been performed may be switched according to a moving speed of an image plane position of an object or time-series change amounts of the coordinates of the joints. Thereby, in a case where the orientation change of the object is small, the accuracy of the first reliability indicating the likelihood of the main object can be maintained, and in a case where the orientation change of the object is large, by using the result of the prediction processing, the object that is likely to be the main object can be detected at an earlier time.

The above method can calculate the first reliability of each of a plurality of objects. This example determines the likelihood of the main object using orientation information by determining whether or not the first reliability is equal to or higher than the first threshold. At this time, since an authenticated object is highly likely to be a main object, changing the first threshold to a smaller value enables the authenticated object to be easily determined as the main object according to the first reliability calculated from the orientation information.

Next, in S4002, the camera CPU 121 reduces the number of image data from which the time-series data of orientation information that is used to calculate the first reliability is acquired. In acquiring orientation information of a person from image data and calculating the first reliability, averaging the first reliabilities calculated using a plurality of image data, or the like can improve the accuracy of the first reliability. However, a period during which the orientation indicating the likelihood of the main object, such as a pass or a shot, is maintained is short. Therefore, in a case where the main object is determined using the first reliability calculated from the orientation information, the determination may use the orientation information obtained from the image data acquired in a short period. Since an authenticated object is highly likely to be a main object, the first reliability can be increased by obtaining orientation information of the authenticated object from a small number of image data and by calculating the first reliability indicating the likelihood of the main object.

Next, in S4003, the camera CPU 121 performs processing for determining whether the object is likely to be the main object based on the orientation information. More specifically, the camera CPU 121 determines whether the object is the main object by calculating the first reliability, and by determining whether or not the first reliability is equal to or higher than the first threshold. This determination processing may process the authenticated objects in order of the second reliability indicating the similarity in the authentication processing. The priority is given to an authenticated object having high second reliability because as the second reliability of the authenticated object becomes higher, the object is more likely to be the main object and thus it is likely that the main object can be determined more quickly if the likelihood of the main object is determined by the orientation information of the object.

Next, in S4004, the camera CPU 121 determines whether or not there is an object that is determined to be an object that is likely to be a main object based on the orientation information in S4003. In a case where there is an object that is determined to be an object that is likely to be a main object, the flow proceeds to S4005; otherwise, the flow proceeds to S4006.

In S4005, the camera CPU 121 determines whether the authenticated object is the same as the object that is determined to be an object that is likely to be the main object based on the orientation information. In a case where they are the same, the flow proceeds to S4006. If they are not the same, the flow proceeds to S4007.

In S4006, the camera CPU 121 determines whether or not there are a plurality of objects that are authenticated objects and each of which is determined to be an object that is likely to be a main object based on the orientation information. In a case where there are more than one, the flow proceeds to S4009; otherwise, the flow proceeds to S4008.

In S4007, the camera CPU 121 determines that the authenticated object is the main object because there is no object that is determined to be an object that is likely to be a main object based on the orientation information.

Referring now to FIG. 16A, a description will be given of the determination in S4007. FIG. 16A illustrates an image in a basketball scene in which a person 921 passes a ball 903 to a person 922 and is displayed on the display unit 131. Reference numeral 1900 denotes a display frame indicating the main object and is displayed on the face of the person 922.

In a case where the person 922 is a person whose face is previously registered in the dictionary data, the person 922 is an authenticated object. Since the orientation information of the person 921 after throwing the pass gives only a low value as the first reliability indicating the likeness of the main object, the object does not become an object that is likely to be a main object according to the orientation information. Therefore, the camera CPU 121 determines that the main object that the user intends to capture is the person 922 whose face has been previously registered and who is an authenticated object.

In S4008, the camera CPU 121 determines as the main object an object that is an authenticated object and is determined to be an object that is likely to be a main object based on the orientation information.

Referring now to FIG. 16B, a description will be given of the determination in S4008. FIG. 16B illustrates an image captured on the display unit 131 in which a person 924 is about to shoot a ball 903 toward a goal 910 in a basketball scene. A person 925 exists between the person 924 and the goal 910. Reference numeral 1900 is a display frame also illustrated in FIG. 16A, and is displayed on the face of the person 924.

In a case where the person 924 is a person whose face has previously been registered in the dictionary data, the person 924 is an authenticated object. From the person 924, the orientation information of the shot state is obtained, and the first reliability indicating that the likelihood of the main object is equal to or higher than the first threshold. Therefore, the camera CPU 121 determines that the main object that the user intends to capture is the person 922 whose face has been previously registered, who is an authenticated object, and who is determined to be an object that is likely to be a main object based on the orientation information.

In S4009, the camera CPU 121 determines as the main object an object that is an authenticated object with high priority set in S3001 and that is determined to be an object that is likely to be a main object based on the orientation information.

Referring now to FIG. 16, a description will be given of the determination in S4009. FIG. 16C illustrates an image captured on the display unit 131 in which a person 926 is trying to shoot a ball 903 toward a goal 910 in a basketball scene and a person 927 is trying to block the shot. Reference numeral 1900 denotes a display frame indicating the main object and is displayed on the face of the person 927.

In a case where the person 927 is a person whose face has been previously registered in the dictionary data, the person 927 is an authenticated object. From the person 926, the orientation information of the shot state is obtained, and the first reliability indicating the likeness of the main object is equal to or higher than the first threshold, so that the person 926 is determined as an object that is likely to be a main object. From the person 927, the orientation information of the shot blocking state is obtained, and the first reliability indicating the likelihood of the main object is equal to or higher than the first threshold, so the person 927 is determined to be an object that is likely to be a main object. In this imaging scene, both the person 926 and the person 927 are likely to be main objects based on the orientation information, but this example determines as the main object the person 927 who is an authentication object that is an object likely to be a main object and has higher priority, based on the orientation information. Thus, even if there are a plurality of objects each of which is determined to be an object that is likely to be a main object based on the orientation information, the person 927 who is an authenticated object with high priority is determined to be the main object.

In a case where the processing from S4006 to S4008 is completed, the camera CPU 121 ends this processing and the flow proceeds to S406 in FIG. 10.

This example can satisfactorily determine the main object that matches the user's intention among the plurality of detected objects.

Example 2

A description will now be given of Example 2. The main object determination processing according to this example gives priority to an object determined to be an object that is likely to be a main object based on the orientation information over an authenticated object. The configuration of the camera 100 according to this example is similar to that of Example 1, and this example is different from Example 1 in part of the object tracking AF processing and main object determination processing. This example will mainly discuss differences from Example 1 in object tracking AF processing and main object determination processing.

Figure 17:
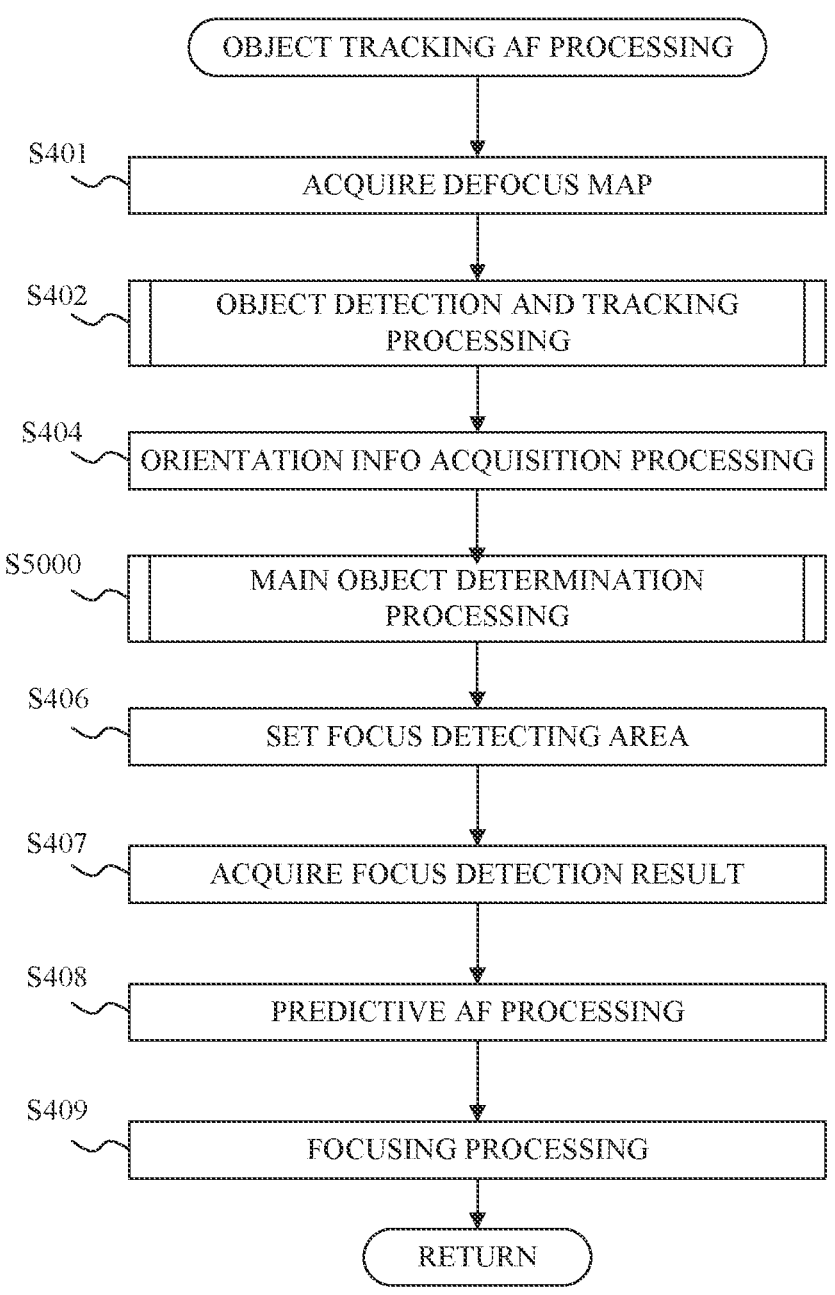
FIG. 17 is a flowchart illustrating object tracking AF processing according to Example 2.

A description will now be given of the object tracking AF processing executed by the camera CPU 121 in S400 of FIG. 8 using a flowchart of FIG. 17. Here, determination of a main object will be described in a case where there are two methods of detecting an object, i.e., a method based on orientation information and a method based on authentication processing.

The processing of S401 and S402 is the same as that of Example 1 (FIG. 10). In S404 next to S402, the camera CPU

121 causes the orientation acquiring unit 142 to perform orientation information acquisition processing as in Example 1.

Next, in S5000, the camera CPU 121 performs main object determination processing. Details of the main object determination process will be described below. This example gives priority to an object determined to be an object that is likely to be a main object based on the orientation information over an authenticated object, and thus orientation information acquisition processing is performed prior to authentication processing, which will be described below.

Subsequent S406 to S409 are similar to those of Example 1. After the focusing processing in S409 ends, the camera CPU 121 ends the object tracking AF processing and the flow proceeds to S5 in FIG. 8.

Figure 18:
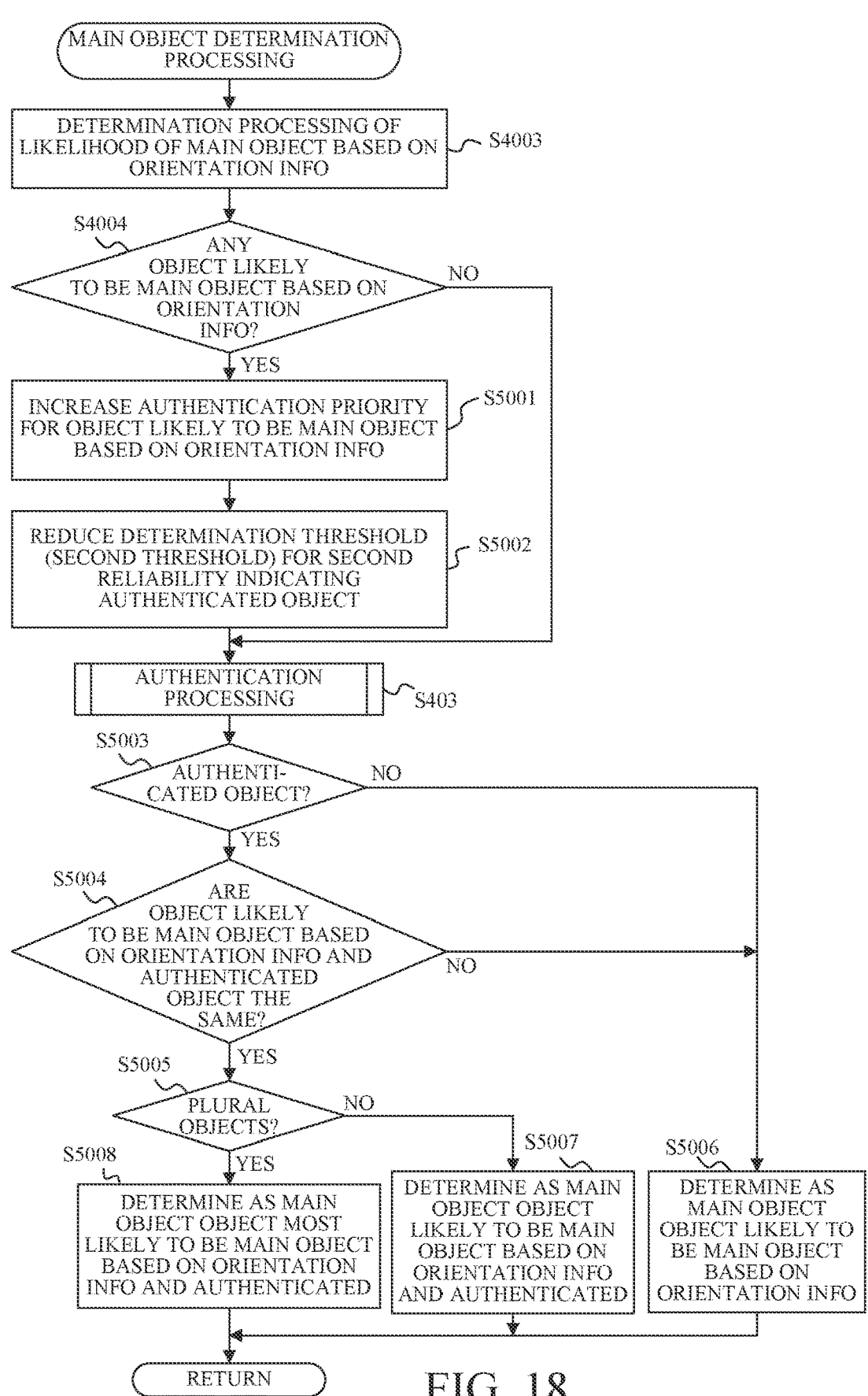
FIG. 18 is a flowchart illustrating main object determination processing according to Example 2.

A description will now be given of the main object determination processing according to this example using a flowchart illustrated in FIG. 18.

The camera CPU 121 first performs determination processing of an object that is likely to be a main object based on the orientation information in S4003, and determines in S4004 whether or not there is an object determined to be an object that is likely to be a main object based on the orientation information. The processing of S4003 and S4004 is similar to that of Example 1 (FIG. 14). In a case where there is an object that is determined to be an object that is likely to be a main object based on the orientation information, the flow proceeds to S5001; otherwise, the flow proceeds to S403.

In S5001, the camera CPU 121 raises the priority of the authentication processing for an object determined to be an object that is likely to be a main object based on the orientation information. The object determined to be the object that is likely to be the main object based on the orientation information is highly likely to be an object that the user intends to capture. Therefore, by raising the priority of the authentication processing for that object, an object determined to be an object that is likely to be a main object based on the orientation information is more likely to be determined as an authenticated object, and as a result, that object is more likely to be determined as the main object.

Next, in S5002, the camera CPU 121 sets the second threshold for determining the main object using the second reliability (second evaluation value), which is the similarity between the feature amount of the face of the authenticated object and the feature amount of the face registered in the dictionary data, to be smaller than that in a case where there is no object likely to be the main object. Thereby, the object determined to be the object that is likely to be the main object based on the orientation information is more likely to be determined as an authenticated object, and as a result, that object is more likely to be determined as the main object. Thereafter, the flow proceeds to S403.

In S403, the camera CPU 121 performs authentication processing as in Example 1 (FIG. 10). At this time, in a case where there is an object that is determined to be an object that is likely to be a main object based on the orientation information in S4004, the priority for the authentication processing set in S5001 and the second threshold set in S5002 are used.

Next, in S5003, the camera CPU 121 determines whether or not an authenticated object exists. In a case where it exists, the flow proceeds to S5004, and in a case where it does not exist, the flow proceeds to S5006.

In S5004, the camera CPU 121 determines whether or not the object determined to be an object that is likely to be a main object based on the orientation information is the same as the authenticated object. In a case where they are the same, the flow proceeds to S5005. If they are not the same, the flow proceeds to S5006.

In S5005, the camera CPU 121 determines whether or not there are a plurality of objects that are authenticated objects and each of which is determined to be an object that is likely to be a main object based on the orientation information. In a case where there are the plurality of objects, the flow proceeds to S5008, and in a case where there are not the plurality of objects, the flow proceeds to S5007.

Figure 19A:
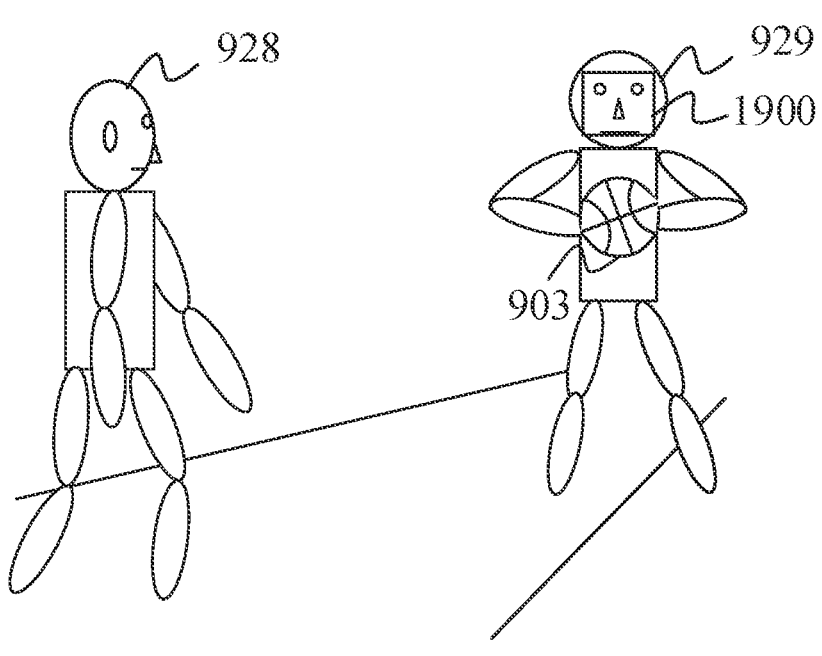
FIGS. 19A and 19B are conceptual diagrams illustrating main object determination processing according to Example 2.

In S5006, the camera CPU 121 determines as the main object the object determined to be an object that is likely to be a main object based on the orientation information. Referring now to FIG. 19A, a description will be given of the determination in S5006. FIG. 19A illustrates an image displayed on the display unit 131 in a basketball scene, which is an image captured in an imaging scene before the person 928 receives the pass of the ball 903 from the object 902.

From the person 929, information about the orientation of the person trying to make a pass can be obtained, so the person 929 is an object with a high first reliability indicating the likelihood of the main object. Here, both persons 928 and 929 are not authenticated objects. In this state, the main object that the user intends to capture is highly likely to be the person 929, who is determined to be an object that is likely to be a main object based on the orientation information, so the camera CPU 121 determines the person 929 as the main object.

In S5007, the camera CPU 121 determines as the main object an object that is determined to be an object that is likely to be a main object based on the orientation information and that is an authenticated object, as described in Example 1 using FIG. 16B.

Figure 19B:
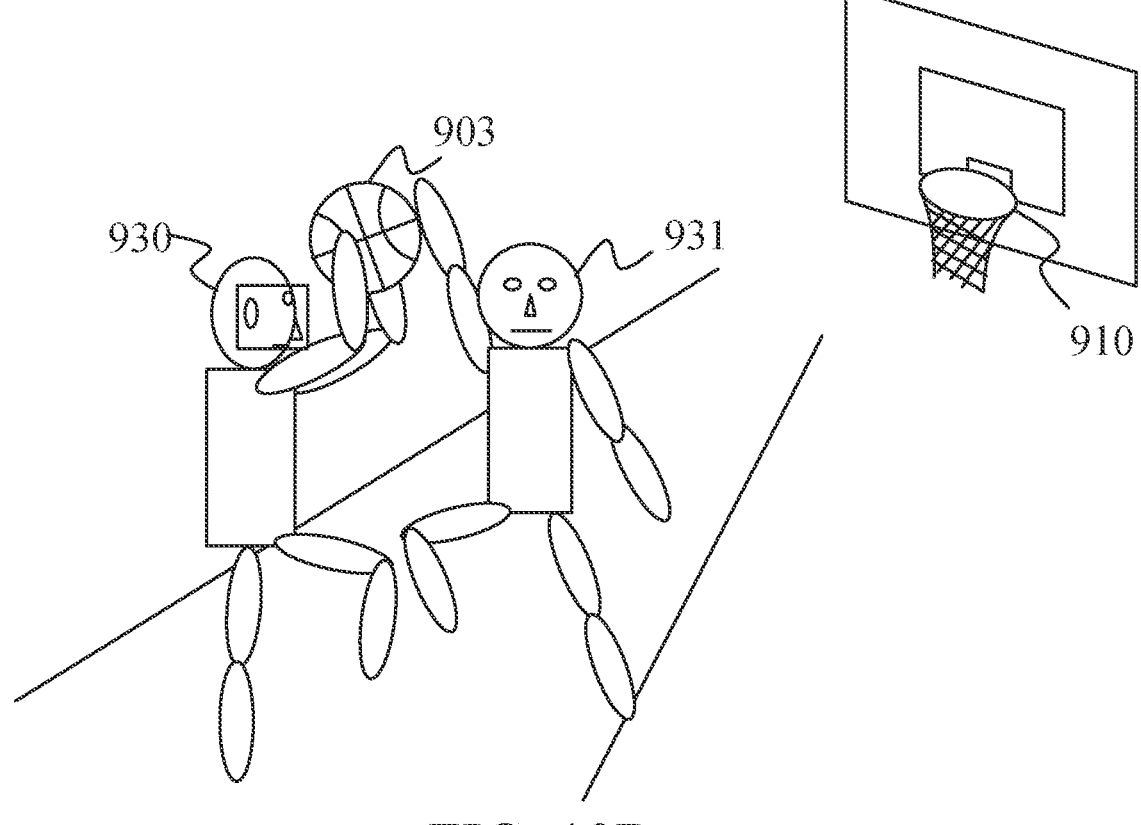

In S5008, the camera CPU 121 determines as the main object an object that is determined to be an object that is most likely to be a main object based on the orientation information and that is an authenticated object. Referring now to FIG. 19B, a description will be given of the determination in S5008. FIG. 19B illustrates an image captured on the display unit 131 in which a person 930 is about to shoot a ball 903 toward a goal 910 in a basketball scene, and a person 931 is trying to block the shot. Reference numeral 1900 denotes a display frame indicating the main object and is displayed on the face of the person 930.

In this example, information about the orientation of the person 930 trying to shoot the ball is obtained, and information about the orientation of the person 931 trying to block the shot is obtained. At this time, in a case where the faces of the persons 930 and 931 are objects whose faces are both previously registered in the dictionary data, the persons 930 and 931 are both authenticated objects. This example determines the person 930 as the main object because information about the shooting orientation of the person 930 is obtained, and the first reliability indicating the likelihood of the main object obtained from the orientation information is equal to or higher than the first threshold and is the highest.

This example also can satisfactorily determine the main object that matches the user's intention among the plurality of detected objects.

In order to facilitate determination of a main object based on orientation information, an orientation that is likely to be the main object may be more easily detected, or an object whose orientation is detected may be more easily selected as the main object. That is, at least one of orientation detection by the orientation acquiring unit (second detector) 142 and determination of the main object by the camera CPU (determining unit) 121 may be controlled so as to reduce the first threshold for the first reliability regarding orientation information or to increase the first reliability.

Each example can satisfactorily determine the main object.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-163318, filed on Oct. 11, 2022, which is hereby incorporated by reference herein in its entirety.

What is claimed is:

1. An object determining apparatus comprising:
a memory storing instructions; and
a processor configured to execute the instructions to:
detect an object from image data obtained by imaging,
acquire information about orientation of the object from the image data,
determine a main object in the image data using a detection result of the object and the information about the orientation,
acquire a first evaluation value indicating possibility that the object is the main object from the information about the orientation,
determine the main object by comparing the first evaluation value and a first threshold, and
change the first threshold according to the detection result of the object.

2. The object determining apparatus according to claim 1, the processor is configured to:

acquire a first evaluation value indicating possibility that the object is the main object from the information about the orientation,
determine the main object by comparing the first evaluation value and a first threshold, and
change the number of pieces of image data obtained by imaging from which the information about the orientation is acquired, for acquiring the first evaluation value according to the detection result of the object.

3. The object determining apparatus according to claim 1, wherein in a case where a plurality of objects are detected from the image data, the processor is configured to determine the main object using the information about the orientation of each of the plurality of objects in order according to the detection result.

4. The object determining apparatus according to claim 1, wherein the processor is configured to acquire a second evaluation value indicating a similarity of the object to registered object data as the detection result of the object.

5. The object determining apparatus according to claim 4, wherein the processor is configured to acquire the second evaluation value using a plurality of registered object data in a preset order.

6. The object determining apparatus according to claim 1, the processor is configured to:
acquire a first evaluation value indicating possibility that the object is the main object from the information about the orientation,
acquire a second evaluation value indicating a similarity of the object to a registered object,
perform authentication processing for the object by comparing the second evaluation value with a second threshold,
determine as the main object an object that has been determined to be an object that is likely to be the main object based on the first evaluation value and that has been authenticated in the authentication processing, and
change the second threshold according to the first evaluation value.

7. The object determining apparatus according to claim 6, wherein in a case where a plurality of objects are detected from the image data, the processor is configured to set priority of the object subject to the authentication processing according to the first evaluation value of each of the plurality of objects.

8. The object determining apparatus according to claim 1, wherein the processor is configured to detect the object using a convolutional neural network.

9. An image pickup apparatus comprising:
an image sensor configured to capture an object image; and
the object determining apparatus according to claim 1.

10. An object determining apparatus comprising:
a memory storing instructions; and
a processor configured to execute the instructions to:
detect an object from image data obtained by imaging,
perform personal authentication for the object,
detect an orientation of the object from the image data and acquire information about the orientation,
determine a main object in the image data using a detection result of the object and the information about the orientation, and
control at least one of a detection of the orientation and a determination of the main object, by prioritizing authentication of an object likely to be the main object based on information about the orientation, so that an authenticated object is more likely to be determined as the main object than an unauthenticated object.

11. The object determining apparatus according to claim 10, wherein the processor is configured to make the number of pieces of image data obtained by imaging from which the information about the orientation is acquired for determining the main object for the authenticated object smaller than that the number of image data for the unauthenticated object.

12. An image pickup apparatus comprising:
an image sensor configured to capture an object image; and
the object determining apparatus according to claim 10.

13. An object determining apparatus comprising:
a memory storing instructions; and
a processor configured to execute the instructions to:
detect an object from image data obtained by imaging,
perform personal authentication for the object,
acquire information about orientation of the object from the image data,
determine a main object in the image data using a detection result of the object and the information about the orientation,
acquire a first evaluation value indicating possibility that the object is the main object from the information about the orientation, and
determine the main object by comparing the first evaluation value and a first threshold,
preferentially determine an authenticated object, since a first reliability indicating a likelihood of the main object obtained from the orientation information is equal to or higher than the first threshold and is the highest, as the main object, in a case where there are a plurality of objects for each of which the information about the orientation has been acquired.

14. An image pickup apparatus comprising:
an image sensor configured to capture an object image; and
the object determining apparatus according to claim 13.

15. An object determining method comprising the steps of:
detecting an object from image data obtained by imaging;
acquiring information about orientation of the object from the image data;
determining a main object in the image data using a detection result of the object and the information about the orientation;
acquiring a first evaluation value indicating possibility that the object is the main object from the information about the orientation, determining the main object by comparing the first evaluation value and a first threshold, and
changing the first threshold according to the detection result of the object.

16. A non-transitory computer-readable storage medium storing a program that causes a computer to execute the object determining method described in claim 15.

17. An object determining method comprising the steps of:
detecting an object from image data obtained by imaging;
performing personal authentication for the object;
detecting an orientation of the object from the image data and acquire information about the orientation;
determining a main object in the image data using a detection result of the object and the information about the orientation; and
controlling at least one of a detection of the orientation and a determination of the main object, by prioritizing authentication of an object likely to be the main object based on information about the orientation, so that an authenticated object is more likely to be determined as the main object than an unauthenticated object.

18. An object determining method comprising the steps of:
detecting an object from image data obtained by imaging;
performing personal authentication for the object;
acquiring information about orientation of the object from the image data;
determining a main object in the image data using a detection result of the object and the information about the orientation;
acquiring a first evaluation value indicating possibility that the object is the main object from the information about the orientation, and
determining the main object by comparing the first evaluation value and a first threshold,
preferentially determining an authenticated object, since a first reliability indicating a likelihood of the main object obtained from the orientation information is equal to or higher than the first threshold and is the highest, as the main object, in a case where there are a plurality of objects for each of which the information about the orientation has been acquired.

19. A non-transitory computer-readable storage medium storing a program that causes a computer to execute the object determining method described in claim 18.

* * * * *